United States Patent
Shi et al.

(10) Patent No.: US 12,238,714 B2
(45) Date of Patent: Feb. 25, 2025

(54) INFORMATION DETERMINATION METHOD AND DEVICE, AND STORAGE MEDIUM

(71) Applicant: ZTE CORPORATION, Guangdong (CN)

(72) Inventors: Jing Shi, Shenzhen (CN); Peng Hao, Shenzhen (CN); Yu Ngok Li, Shenzhen (CN); Xianghui Han, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/487,332

(22) Filed: Oct. 16, 2023

(65) Prior Publication Data

US 2024/0163873 A1 May 16, 2024

Related U.S. Application Data

(63) Continuation of application No. 17/158,861, filed on Jan. 26, 2021, now Pat. No. 11,792,790, which is a (Continued)

(30) Foreign Application Priority Data

Aug. 15, 2019 (CN) .......................... 201910754997.2

(51) Int. Cl.
*H04L 5/00* (2006.01)
*H04W 72/0446* (2023.01)
*H04W 72/1273* (2023.01)
*H04W 72/23* (2023.01)
*H04W 72/232* (2023.01)
(Continued)

(52) U.S. Cl.
CPC ... *H04W 72/1273* (2013.01); *H04W 72/0446* (2013.01); *H04W 72/23* (2023.01); *H04W 72/569* (2023.01); *H04W 76/11* (2018.02); *H04W 76/27* (2018.02)

(58) Field of Classification Search
None
See application file for complete search history.

(56) References Cited

U.S. PATENT DOCUMENTS 10,939,382 B2 * 3/2021 Zhou .................... H04W 52/04
11,297,674 B2 * 4/2022 He ....................... H04W 76/28
(Continued)

FOREIGN PATENT DOCUMENTS

CN 109475000 A 3/2019
CN 110138525 A 8/2019
(Continued)

OTHER PUBLICATIONS

First EP Office Action on EP AppIn No. 20852512.1, dated Dec. 21, 2023 (8 pages).
(Continued)

*Primary Examiner* — Ajit Patel
(74) *Attorney, Agent, or Firm* — Foley & Lardner LLP

(57) ABSTRACT

Provided are an information determination method and device and a storage medium. The information determination method includes determining a time domain resource allocation (TDRA) table with a physical downlink control channel (PDCCH) related symbol served as a reference point of a start length indicator value (SLIV).

17 Claims, 1 Drawing Sheet

Related U.S. Application Data continuation of application No. PCT/CN2020/108091, filed on Aug. 10, 2020.

(51) Int. Cl.
   *H04W 72/566* (2023.01)
   *H04W 76/11* (2018.01)
   *H04W 76/27* (2018.01)

(56) References Cited

U.S. PATENT DOCUMENTS

| | | | |
|---|---|---|---|
| 11,457,434 | B2* | 9/2022 | Ying .................. H04L 1/0061 |
| 2014/0119269 | A1 | 5/2014 | Guan et al. |
| 2015/0327226 | A1 | 11/2015 | Cheng et al. |
| 2018/0199229 | A1 | 7/2018 | Lee et al. |
| 2019/0082431 | A1 | 3/2019 | Yi et al. |
| 2019/0149365 | A1 | 5/2019 | Chatterjee et al. |
| 2019/0165846 | A1 | 5/2019 | Kim et al. |
| 2019/0174466 | A1 | 6/2019 | Zhang et al. |
| 2019/0182807 | A1* | 6/2019 | Panteleev ............ H04L 5/0048 |
| 2019/0223084 | A1 | 7/2019 | John Wilson et al. |
| 2019/0274032 | A1* | 9/2019 | Chatterjee ................ H04L 5/00 |
| 2019/0363843 | A1* | 11/2019 | Gordaychik .............. H04L 1/08 |
| 2020/0022144 | A1* | 1/2020 | Papasakellariou .... H04W 72/23 |
| 2021/0385826 | A1* | 12/2021 | Moon ...................... H04L 1/00 |
| 2022/0158788 | A1* | 5/2022 | Horiuchi ............ H04W 72/044 |
| 2022/0216972 | A1* | 7/2022 | Takeda ................. H04W 24/08 |
| 2022/0321278 | A1* | 10/2022 | Yoshioka .............. H04L 1/1854 |

FOREIGN PATENT DOCUMENTS

| | | | |
|---|---|---|---|
| CN | 110536448 A | 12/2019 | |
| EP | 2 317 681 B1 | 5/2011 | |
| EP | 3811699 B1 * | 4/2023 | .......... H04L 1/0061 |
| KR | 10-2019-0027705 A | 3/2019 | |
| WO | WO-2019/093865 A1 | 5/2019 | |
| WO | WO-2019/137274 A1 | 7/2019 | |
| WO | WO-2019/144932 A1 | 8/2019 | |

OTHER PUBLICATIONS

OPPO, "PDCCH enhancement for URLLC," 3GPP TSG RAN WG1 #96bis, R1-1904042, Xi'an, China, Apr. 2, 2019 (6 pages).
CATT, "On PDSCH and PUSCH resource allocation" 3GPP TSG RAN WG1 Meeting AH 1801, R1-1800257, Jan. 26, 2018, Vancouver, Canada (23 pages).
CATT: "On PDSCH and PUSCH resource allocation" 3GPP TSG RAN WG1 Meeting AH 1801; R1-1800257; Jan. 26, 2018; Vancouver, Canada (22 pages).
Ericsson: "Benefits of Enhanced PDCCH Monitoring Capability for URLLC" 3GPP TSG-RAN WG1 Meeting #97; R1-1906109; May 17, 2019; Reno, Nevada (9 pages).
Ericsson: "Summary of 7.3.3.1 (resource allocation)" TSG-RAN WG1 AdHoc 1801; R1-1801011; Jan. 26, 2018; Vancouver, Canada (14 pages).
Extended European Search Report for EP Appl. No. 20852512.1, dated Nov. 11, 2021 (11 pages).
First Office Action for CN Appl. No. 2021102370249, dated Jul. 29, 2022 (with English translation, 14 pages).
First Office Action for JP Appl. No. 2021-510309, dated Mar. 24, 2022 (with English translation, 8 pages).
Huawei "Feature lead summary of HARW enhancements for NR-U" 3GPP TSG RAN WG1 Meeting #97, R1-1907652, May 17, 2019, Reno, USA (24 pages).
Huawei et al.: "Remaining issues on DCI contents and formats" R1-1803707; 3GPP TSG RAN WG1 Meeting #92bis; Apr. 20, 2018; Sanya, China (9 pages).
International Search Report and Written Opinion for PCT Appl. No. PCT/CN2020/108091 mailed Oct. 29, 2020 (with English translation, 12 pages).
Nokia et al.: "Summary of contributions on PUSCH enhancements for NR eURLLC (AI 7.2.6.3)" R1-1907695; 3GPP TSG-RAN WG1 Meeting #97; May 17, 2019; Reno, Nevada (27 pages).
Notice of Allowance on U.S. Appl. No. 17/158,861 Dtd Aug. 23, 2023.
Wilus Inc.: "On DCI enhancement for NR URLLC" 3GPP TSG RAN WG1 #97; R1-1907384; May 17, 2019; Reno, USA (3 pages).
ZTE: "On PDCCH enhancements for NR URLLC" 3GPP TSG RAN WG1 #98bis; R1-1910100; Oct. 20, 2019; Chongqing, China (15 pages).
Ericsson, "PDCCH Enhancements for NR URLLC", 3GPP TSG-RAN WG1 Meeting #97, Tdoc R1-1906091, May 17, 2019, Reno, Nevada, US (13 pages).
ETSI TS 138 213 V15.6.0 (Jul. 2019), Technical Specification, "5G; NR; Physical layer procedures for control (3GPP TS 38.213 version 15.6.0 Release 15)" (110 pages).
Huawei, "CR to 38.212 capturing the Jan. 18 ad-hoc and RAN1#92 meeting agreements", 3GPP TSG RAN WG1 Meeting #92, R1-1803553, Mar. 1, 2018, Athens (100 pages).
Nokia et al., "Summary of Tuesday offline discussion on PUSCH enhancements for NR eURLLC (AI 7.2.6.3)", 3GPP TSG-RAN WG1 Meeting #97, R1-1907766, May 17, 2019, Reno, Nevada (27 pages).
Nokia, "Corrections to 38.214 including alignment of terminology across specifications", 3GPP TSG RAN WG1 #97, R1-1907867, May 17, 2019, Reno, Nevada, U.S.A. (39 pages).
Office Action for KR Appl. No. 10-2021-7005438, dated Apr. 22, 2024 (with English translation, 8 pages).

* cited by examiner

Determine a time domain resource allocation (TDRA) table with a physical downlink control channel (PDCCH) related symbol served as a reference Point of a start length indicator value (SLIV) ~S120
FIG. 1
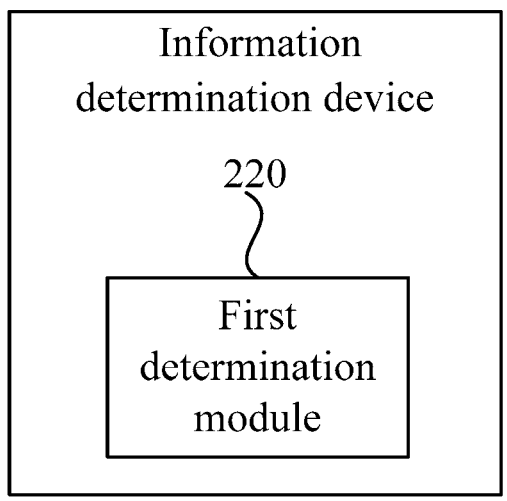
FIG. 2
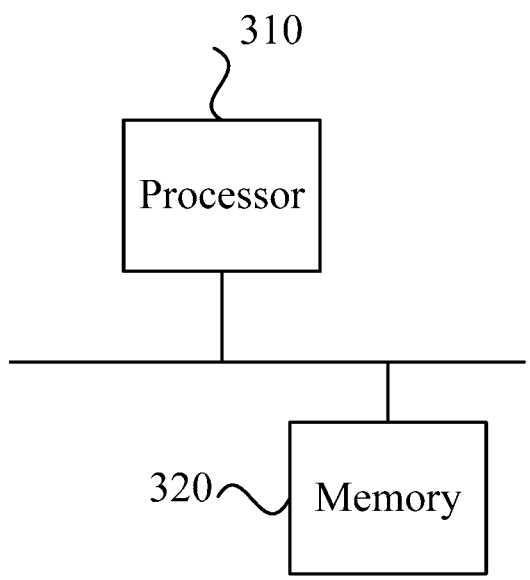
FIG. 3

INFORMATION DETERMINATION METHOD AND DEVICE, AND STORAGE MEDIUM

CROSS-REFERENCE TO RELATED APPLICATIONS

This application claims the benefit of priority under 35 U.S.C. § 120 as a continuation of U.S. Non-Provisional Patent Application Ser. No. 17/158,861, filed on Jan. 26, 2021, which is a continuation of PCT Patent Application No. PCT/CN2020/108091, filed on Aug. 10, 2020, which claims priority to Chinese patent application no. 201910754997.2, filed on Aug. 15, 2019, the disclosure of each of which is incorporated herein by reference in its entirety.

TECHNICAL FIELD

The present application relates to the field of wireless communication networks, for example, to an information determination method and device, and a storage medium.

BACKGROUND

To support features of ultra-reliable and low latency transmission, transmission is performed with a relatively short transmission time interval and a relatively low code rate. The relatively short transmission time interval may be a single or multiple orthogonal frequency division multiplexing (OFDM) symbols. For a physical downlink control channel (PDCCH), transmission opportunities may be provided at multiple occasion positions in a slot to reduce a waiting time after data arrives, thereby ensuring the low latency transmission and the high reliable transmission through a high aggregation level. Therefore, how to allocate time domain resources is an urgent problem to be solved.

SUMMARY

Embodiments of the present application provide an information determination method and device and a storage medium, which can reduce overheads required for a time domain resource allocation.

The embodiments of the present application provide an information determination method. The method includes a step described below.

A time domain resource allocation (TDRA) table with a physical downlink control channel (PDCCH) related symbol served as a reference point of a start length indicator value (SLIV) is determined.

The embodiments of the present application provide an information determination method. The method includes a step described below.

A reference point of an SLIV is determined. The reference point includes: a slot boundary or a PDCCH related symbol.

The embodiments of the present application provide an information determination method. When a first downlink control information (DCI) format and a second DCI format are used for scheduling a traffic channel, a determination method of a priority corresponding to the traffic channel includes one of steps described below.

A priority corresponding to the first DCI format for scheduling the traffic channel is configured to be higher than a priority corresponding to the second DCI format for scheduling the traffic channel.

A lowest priority corresponding to the first DCI format for scheduling the traffic channel is configured to be equal to a priority corresponding to the second DCI format for scheduling the traffic channel.

The embodiments of the present application provide an information determination method. The method includes a step described below.

When a new DCI format is added, a DCI size alignment operation is performed. The new DCI format includes: a format 0_2 for scheduling an uplink traffic channel and a format 1_2 for scheduling a downlink traffic channel; a size threshold is a number of DCI size types, which are handled by a user equipment (UE) in each cell, less than or equal to 4, and a number of DCI size types, which are scrambled by a cell-radio network temporary identifier (C-RNTI), does not exceed 3; or a size threshold is a number of DCI size types, which are handled by a UE in each cell, less than or equal to 5, and a number of DCI size types, which are scrambled by C-RNTI, does not exceed 4.

The embodiments of the present application provide an information determination method. The method includes a step described below.

A maximum number of control channel elements (CCEs) of each time span is determined.

The embodiments of the present application provide an information determination device. The device includes a first determination module.

The first determination module is configured to determine a time domain resource allocation (TDRA) table with a physical downlink control channel (PDCCH) related symbol served as a reference point of a start length indicator value (SLIV).

A storage medium is provided by an embodiment of the present application. The storage medium is configured to store computer a program which, when executed by a processor, implements the method of any embodiment described above.

BRIEF DESCRIPTION OF DRAWINGS

FIG. 1 is a flowchart of an information determination method provided by an embodiment of the present application;

FIG. 2 is a block diagram of an information determination device provided by an embodiment of the present application; and FIG. 3 is a structural diagram of a device provided by an embodiment of the present application.

DETAILED DESCRIPTION

The embodiments of the present application will be described below in detail with reference to the drawings. If not in collision, the embodiments described herein and the features thereof can be combined with each other.

In a new radio (NR) release 15 (R15) system, a mechanism for a time domain resource allocation may be: using radio resource control (RRC) to configure a time domain resource allocation (TDRA) table. Each TDRA table includes multiple row indexes, and each row index includes: a slot offset, a starting symbol, a length (a number of symbols), a traffic channel mapping type, and one of the multiple row indexes may be dynamically indicated through downlink control information (DCI). An index of the starting symbol may use a slot boundary as a reference point, that is, symbol indexes in a slot with 14 symbols are 0 to 13. To support low-latency and high-reliability requirements of the ultra reliable low latency communication (URLLC), time domain resources allocated by the time domain resource allocation are usually relatively short, overheads and flexibility of the allocation are controlled, and the URLLC usually support multiple PDCCH transmission opportunities in a time slot, one manner is to change a reference point of a start length indicator value (SLIV) for a time domain resource allocation of a physical downlink shared channel (PDSCH) from a slot boundary to a PDCCH related symbol (such as a PDCCH starting symbol, a PDCCH ending symbol, etc.), so as to save unnecessary RRC configuration, i.e., to save DCI overheads. Therefore, for the time domain resource allocation of the URLLC, configuration and usage of a TDRA table configured by the RRC is an urgent problem to be solved.

To save the DCI overheads, the embodiments of the present application provide an information determination method, which saves the DCI overheads required for the time domain resource allocation.

FIG. 1 is a flowchart of an information determination method provided by an embodiment of the present application. As shown in FIG. 1, the method provided by this embodiment includes a step S120 described below.

In step S120, a time domain resource allocation (TDRA) table with a physical downlink control channel (PDCCH) related symbol served as a reference point of a start length indicator value (SLIV) is determined.

In an embodiment, the PDCCH related symbol includes at least one of: a PDCCH starting symbol, a PDCCH ending symbol, a sum of the PDCCH starting symbol and a first preset number of symbols, or a sum of the PDCCH ending symbol and the first preset number of symbols; the PDCCH starting symbol is a first symbol in time domain symbols used for transmitting a PDCCH, and the PDCCH ending symbol is a last symbol in time domain symbols used for transmitting the PDCCH. In the embodiment, the PDCCH starting symbol is the first symbol in the time domain symbols used for transmitting the PDCCH, that is, a first symbol in a control resource set (CORESET) corresponding to a search space in which the transmitted PDCCH is located; the PDCCH ending symbol is a last symbol in the time domain symbols used for transmitting the PDCCH, that is, a last symbol in the CORESET corresponding to the search space in which the transmitted PDCCH is located.

Candidate allocation results may be configured through higher layer signaling RRC, and then one of the candidate allocation results configured by the RRC may be dynamically indicated through DCI to determine a time domain resource of this traffic channel. For the time domain resource allocation of the PDSCH, parameters configured by the RRC include: a slot offset K0, an SLIV (or an independent indicator start S and a length L) and a PDSCH mapping type. For the time domain resource allocation of a physical uplink shared channel (PUSCH), parameters configured by the RRC include: a slot offset K2, an SLIV (or an independent indicator start S and a length L) and a PUSCH mapping type. For the time domain resource allocation of the URLLC, since allocated time domain resources usually are relatively short, and the overheads and the flexibility of allocation are controlled, and the URLLC usually supports multiple PDCCH transmission opportunities in a time slot, one manner is to adjust a reference point of one of an SLIV or an S for a time domain resource allocation (the reference point of one of the SLIV or the S for the time domain resource allocation will be abbreviated as the reference point) of the PDSCH from a slot boundary to one of: the PDCCH starting symbol, the PDCCH ending symbol, the PDCCH starting symbol plus X symbols or the PDCCH ending symbol plus X symbols to save unnecessary RRC configuration and DCI overheads. X is an integer. In the embodiment, the configuration of the reference point is described by taking the PDCCH starting symbol as an example.

In an embodiment, the step in which the TDRA table with the PDCCH related symbol served as the reference point of the SLIV is determined includes a step described below. The TDRA table with the PDCCH related symbol served as the reference point of the SLIV is determined in an independent configuration manner. The TDRA table configured by the RRC uses the slot boundary served as the reference point of the SLIV. In the embodiment, the TDRA table with the PDCCH related symbol served as the reference point of the SLIV may be independently configured. Exemplarily, the step in which the TDRA table with the PDCCH related symbol served as the reference point of the SLIV is independently configured is illustrated by taking an example of serving the PDCCH starting symbol as the PDCCH related symbol. Two sets of RRC are respectively used for configuring the TDRA table with the slot boundary served as the reference point of the SLIV and the TDRA table with the PDCCH starting symbol served as the reference point of the SLIV.

Exemplarily, table 1 is the RRC-configured TDRA table with the slot boundary served as the reference point of the SLIV provided by an embodiment of the present application. As shown in table 1, each row index includes a slot offset (K0), a starting symbol (S), a length (L), a traffic channel mapping type, and one of row indexes is dynamically indicated through the DCI, eight row indexes are configured in table 1, and then three bits in the DCI are required for indicating one of the row indexes. If the TDRA table has sixteen row indexes, then four bits in the DCI are required for indicating one of the row indexes; if the TDRA table has four row indexes, two bits in the DCI are required for indicating one of the row indexes; if the TDRA table has two row indexes, then one bit in the DCI is required for indicating one of the row indexes; and if TDRA table has one row index, no bit in the DCI is required for indicating the one row index, which is equivalent to requiring 0 bit. In table 1, an index of the starting symbol S uses the slot boundary served as the reference point, that is, symbol indexes in a slot with 14 symbols are 0 to 13. If the PUSCH is scheduled, the slot offset in table 1 is adjusted from K0 to K2, and other types will not be repeated here. The starting symbol S in table 1 is the above-mentioned reference point.

TABLE 1

RRC-configured TDRA table with a slot boundary served as a reference point of an SLIV

| Row Index | Slot Offset | Starting Symbol | Length | Traffic Channel Mapping Type |
|---|---|---|---|---|
| 0 | 0 | 2 | 12 | Type A |
| 1 | 0 | 3 | 11 | Type A |
| 2 | 0 | 2 | 10 | Type A |
| 3 | 0 | 3 | 9 | Type A |
| 4 | 0 | 2 | 4 | Type B |
| 5 | 0 | 10 | 4 | Type B |
| 6 | 0 | 4 | 4 | Type B |
| 7 | 0 | 6 | 4 | Type B |

Exemplarily, table 2-1 and table 2-2 are RRC-configured TDRA tables with the PDCCH starting symbol served as the reference point of the SLIV provided by an embodiment of the present application. As shown in table 2-1 and table 2-2, each row index includes a slot offset (K0), a starting symbol (S), a length (L), a traffic channel mapping type, and one of the row indexes is indicated dynamically through the DCI. The index of the starting symbol S uses the PDCCH starting symbol served as the reference point. This embodiment only takes the PDCCH starting symbol as an example for illustration, that is, the index 0 of the starting symbol indicates a first symbol in time domain symbols used for transmitting the PDCCH. In an embodiment, the reference point of the SLIV may also be one of the PDCCH ending symbol, the PDCCH ending symbol plus X symbols, or the PDCCH starting symbol plus X symbols. If the PDCCH ending symbol is used as the reference point, the index 0 of the starting symbol indicates a last symbol in the time domain symbols used for transmitting the PDCCH, and others will not be repeated here. If the PUSCH is scheduled, K0 in table 2-1 and table 2-2 is replaced with K2, and other types will not be repeated here.

TABLE 2-1

RRC-configured TDRA table with the PDCCH starting symbol served as the reference point of the SLIV

| Row index | K0 | S | L | Mapping type |
|---|---|---|---|---|
| 0 | 0 | 0 | 7 | Type B |
| 1 | 0 | 0 | 4 | Type B |
| 2 | 0 | 0 | 2 | Type B |
| 3 | 0 | 0 | 10 | Type B |
| 4 | 0 | 1 | 9 | Type B |
| 5 | 0 | 1 | 7 | Type B |
| 6 | 0 | 1 | 4 | Type B |
| 7 | 0 | 1 | 2 | Type B |

TABLE 2-2

RRC-configured TDRA table with the PDCCH starting symbol served as the reference point of the SLIV

| Row index | K0 | S | L | Mapping type |
|---|---|---|---|---|
| 0 | 0 | 0 | 4 | Type B |
| 1 | 0 | 1 | 4 | Type B |

As shown in table 2-1 and table 2-2, through independently configuration of the TDRA table with the PDCCH starting symbol served as the reference point of the SLIV, a resource allocation with a same length at multiple time domain positions can be implemented with a smaller overhead and the reliability is improved; or resources with multiple lengths are allocated with a same overhead and the scheduling flexibility is improved.

In an embodiment, the step in which the TDRA table with the PDCCH related symbol served as the reference point of the SLIV is determined includes a step described below. A TDRA table configured by serving the slot boundary as the reference point of the SLIV is taken as the TDRA table configured by serving the PDCCH related symbol as the reference point of the SLIV. In the embodiment, on the basis of only one TDRA table, the TDRA table with the PDCCH related symbols served as the reference point of the SLIV may be implicitly obtained through this one TDRA table. This one TDRA table is the TDRA table configured by serving the slot boundary as the reference point of the SLIV. In the embodiment, the step in which the TDRA table configured by serving the PDCCH starting symbol as the reference point of the SLIV is implicitly obtained will be illustrated by taking an example of serving the PDCCH starting symbol as the PDCCH related symbol. Table 3 is an RRC-configured TDRA table with the slot boundary served as the reference point of the SLIV provided by an embodiment of the present application. Each row index includes a slot offset, a starting symbol, a length (a number of symbols) and a traffic channel mapping type, and one of the row indexes is dynamically indicated through the DCI. The index of the starting symbol S uses the slot boundary served as the reference point, that is, symbol indexes in a slot with 14 symbols are 0 to 13.

TABLE 3

RRC-configured TDRA table with the slot boundary served as the reference point of the SLIV

| Row index | K0 | S | L | Mapping type |
|---|---|---|---|---|
| 0 | 0 | 2 | 12 | Type A |
| 1 | 0 | 3 | 11 | Type A |
| 2 | 0 | 2 | 10 | Type A |
| 3 | 0 | 3 | 9 | Type A |
| 4 | 0 | 2 | 4 | Type B |
| 5 | 0 | 0 | 4 | Type B |
| 6 | 0 | 4 | 4 | Type B |
| 7 | 0 | 6 | 4 | Type B |

Exemplarily, as shown in table 3, when the mapping type is the Type A, the starting symbol S may be 0 to 3; when the mapping type is the Type B, the length L is limited. Alternatively, the length L is 2, 4 or 7.

In an embodiment, the manner of implicitly obtaining the TDRA table with the PDCCH related symbol served as the reference point of the SLIV from the TDRA table includes one of following steps: the TDRA table with the PDCCH related symbol served as the reference point of the SLIV is still taken as the TDRA table, and for an invalid state, it is not indicated through the DCI; a part of row indexes of the TDRA table is selected as the TDRA table configured by serving the PDCCH related symbol as the reference point of the SLIV; or the PDCCH related symbol or the slot boundary is re-configured as the reference point of the SLIV for each row index in the TDRA table.

In an embodiment, when the TDRA table is still taken as the TDRA table with the PDCCH related symbol served as the reference point of the SLIV, the step in which the TDRA table with the PDCCH related symbol served as the reference point of the SLIV is determined includes a step described below. Whether serving the PDCCH related symbol as the reference point of the SLIV is in the invalid state is determined, when serving the PDCCH related symbol as the reference point of the SLIV is not in the invalid state, a corresponding row index in the TDRA table is indicated through the DCI. In the embodiment, the TDRA table configured by serving the slot boundary as the reference point of the SLIV is taken as the TDRA table configured by serving the PDCCH related symbol as the reference point of the SLIV, and then a row index in the invalid state is not indicated through the DCI.

In an embodiment, when a PDSCH or a PUSCH is used for scheduling, the invalid state includes at least one of: a case where the reference point of the SLIV exceeds the slot boundary, or a case where a sum of the reference point of the SLIV and the length exceeds the slot boundary. Exemplarily, for the PDSCH or PUSCH scheduling, when S or S+L exceeds the slot boundary, the corresponding row index is in the invalid state; for a PUSCH repetition scheduling, when S+L exceeds the slot boundary, then the row index is in a valid state. A meaning of crossing/exceeding the slot boundary may be: S>13 (namely, the reference point S crosses/ exceeds the slot boundary), or S+L>14 (namely, the time domain resource allocation determined by the reference point and length crosses/exceeds the slot boundary).

In an embodiment, the step in which the TDRA table configured by serving the slot boundary as the reference point of the SLIV is taken as the TDRA table configured by serving the PDCCH related symbol as the reference point of the SLIV includes one of steps described below. The reference point of the SLIV of each row index in the TDRA table is configured as one of the PDCCH related symbol or the slot boundary. A reinterpretation of the reference point of the SLIV is performed, a starting symbol of the reinterpretation is S, and S=0. In the embodiment, each row index in the TDRA table is configured by serving the PDCCH related symbol as the reference point or the slot boundary as the reference point, namely, each row index in the TDRA table is reconfigured, and then row indexes with the PDCCH related symbol served as the reference point of the SLIV may be regarded as the TDRA table with the PDCCH related symbol as the reference point of the SLIV. In an embodiment, the starting symbol S in the TDRA table may be reinterpreted directly, namely, S=0.

In an embodiment, the step in which the TDRA table with the PDCCH related symbol served as the reference point of the SLIV is determined includes steps described below. A part of row indexes of the TDRA table configured by serving the slot boundary as the reference point of the SLIV is selected. The part of row indexes is served as the TDRA table with the PDCCH related symbol served as the reference point of the SLIV. In the embodiment, the part of the row indexes in the TDRA table configured by serving the slot boundary as the reference point of the SLIV may be directly selected as the TDRA table with the PDCCH related symbol served as the reference point of the SLIV.

In an embodiment, the step in which the part of row indexes of the TDRA table configured by serving the slot boundary as the reference point of the SLIV is selected includes a step described below. First row indexes with the first preset number are selected as the part of row indexes. Alternatively, the part of row indexes is selected in a bitmap form. In the embodiment, the part of row indexes is selected in the bitmap form. Taking table 3 and using the bitmap form as an example, it is assumed that the bitmap is 8-bit 00001100, which indicates that row index#4 and row index#5 in table 3 are served as the TDRA table with the PDCCH related symbol served as the reference point of the SLIV. One bit in the DCI may be used for indicating two row indexes (including the row index #4 and row index #5) in the corresponding TDRA table. Exemplarily, first X row indexes are selected as the TDRA table with the PDCCH related symbol served as the reference point. In an embodiment, when the TDRA table with the PDCCH related symbol served as the reference point of the SLIV is obtained in the above implicit manner from the TDRA table, all reference point S may be reinterpreted as 0, that is, a starting symbol of the traffic channel is the same as the PDCCH starting symbol.

In an embodiment, when K0=2, i.e., the slot offset is K2, the TDRA table with the PDCCH related symbol served as the reference point of the SLIV is obtained from the TDRA table in the above implicit manner, then the starting symbol S in the TDRA table with the PDCCH related symbol served as the reference point of the SLIV is reinterpreted, and the starting symbol S is reinterpreted as 0, that is, the starting symbol of the traffic channel is the same as the PDCCH starting symbol.

In the above embodiment, the TDRA table with the PDCCH starting symbol served as the reference point of the SLIV is obtained in the implicit manner, the resource allocation with a same length at multiple time domain positions can be implemented with a smaller overhead and the reliability is improved; or resources with multiple lengths are allocated with a same overhead and the scheduling flexibility is improved.

In an embodiment, when there is more than one TDRA table, and at least one TDRA table uses the PDCCH related symbol served as the reference point of the SLIV, PDCCHs at different positions of the PDCCH related symbol or PDCCHs with different time spans use TDRA tables which are not totally same.

In an embodiment, the step in which PDCCHs at different positions of the PDCCH related symbol or PDCCHs with different time spans use the TDRA tables which are not totally same includes one of steps described below. A PDCCH at each position or a PDCCH with each time span uses one type of the TDRA tables. X starting symbol sets use X TDRA tables respectively, elements in every two of the X starting symbol sets are different from each other and a union set of the X starting symbol sets includes all symbols in a slot, or elements in each of the X starting symbol sets are independently configured. X span sets use X TDRA tables respectively, elements in every two of the X span sets are different from each other and a union set of the X span sets includes all spans in a time span pattern, or elements in each of the X span sets are independently configured. In the embodiment, the existing RRC-configured TDRA table uses the slot boundary as the reference point, it is assumed that the TDRA table with the PDCCH related symbol served as the reference point of the SLIV may be obtained through independent configuration or may be obtained implicitly through a table in the related art, and there may be one or more TDRA tables based on the PDCCH related symbol served as the reference point. In the embodiment, the step in which the PDCCHs at different positions of the PDCCH related symbol or the PDCCHs with different time spans use the TDRA tables which are not totally same is illustrated by taking an example of serving the PDCCH starting symbol as the PDCCH related symbol.

It is assumed that there are X TDRA tables, the PDCCHs at different positions of the PDCCH starting symbol or with different time spans use the TDRA tables which are not totally same. Exemplarily, it is assumed that there are PDCCHs at X types of positions of the PDCCH starting symbol or PDCCHs with X time spans, a PDCCH at each position of the starting symbol or a PDCCH with each time span uses one type of the TDRA tables, and X TDRA tables are used in total. For example, X=7, in this case, seven non-overlapping 2 OFDM symbol (OS) spans are divided from one slot, and the PDCCH with each time span uses one type of the TDRA tables. For another example, X starting symbol sets are respectively used by X RRC TDRA tables, elements in every two of these X starting symbol sets are different from each other and the union set of the X starting symbol sets includes all symbols in the slot, such as X=2, at this time, seven non-overlapping 2 OFDM symbol (OS) spans are divided from one slot. In this case, a set 0 includes PDCCHs in first three spans, a set 1 includes PDCCHs in last four spans, and two sets respectively use one type of the TDRA tables.

In an embodiment, when there is more than one RRC TDRA table, the length L in at least one RRC TDRA table is limited. For example, L is less than a threshold P, and alternatively, P is 2, 4 or 7.

In this embodiment, the TDRA table with the PDCCH starting symbol served as the reference point is obtained in the implicit manner, the resource allocation with a same length at multiple time domain positions can be implemented with a smaller overhead and the reliability is improved; or resources with multiple lengths are allocated with a same overhead and the scheduling flexibility is improved.

In an embodiment, an information determination method includes a step described below. A reference point of an SLIV is determined, the reference point includes: a slot boundary or a PDCCH related symbol. The slot boundary is a start of a slot. For example, for the slot boundary, if S=0, it refers to a first symbol in the slot; for another example, for the slot boundary, if S=2, it refers to a third symbol in the slot, and so on, which will not be repeated herein. In an embodiment, when the possibility of more than one reference point of the SLIV exists, the more than one reference point of the SLIV includes at least one of: a PDCCH starting symbol, a PDCCH ending symbol, a starting symbol of a CORESET where a PDCCH is located, an ending symbol of the CORESET where the PDCCH is located, a slot boundary, where the slot boundary is a slot boundary determined by a scheduling timing K0 or K2; a starting symbol of a first available traffic channel, where the traffic channel is the PDSCH or the PUSCH; the PDCCH starting symbol plus X symbols, or the PDCCH ending symbol plus X symbols. In an embodiment, the step in which the reference point of the SLIV is determined includes one of steps described below. The reference point of the SLIV is determined according to a traffic channel type, and the traffic channel type comprises a Type A and a Type B; the PDCCH related symbol is served as the reference point of the SLIV by default; when a sum of the reference point of the SLIV and a length exceeds the slot boundary, it is determined that the reference point of the SLIV is the slot boundary; the reference point of the SLIV is determined according to a position of the PDCCH related symbol, or the reference point of the SLIV is determined according to a downlink control information (DCI) format for scheduling the traffic channel.

In an embodiment, the reference point of the SLIV may be determined according to a preset rule or a base station notification manner. In an embodiment, a manner for determining the reference point of the SLIV is described by taking an example of serving the PDCCH starting symbol or the slot boundary as the reference point of the SLIV. The reference point of the SLIV may also be one of the PDCCH ending symbol, the PDCCH starting symbol plus X symbols, the PDCCH ending symbol plus X symbols, or the starting symbol of the first available traffic channel, which is not limited by the embodiments of the present application. In this embodiment, when the PDCCH starting symbol or the slot boundary is served as the reference point of the SLIV, the determination manner of the reference point of the SLIV includes one of manners described below.

In an embodiment, the reference point of the SLIV is determined according to the traffic channel type. For example, when the traffic channel is the Type A, the slot boundary is served as the reference point of the SLIV; and when the traffic channel is the Type B, the PDCCH starting symbol is served as the reference point of the SLIV.

In an embodiment, the PDCCH starting symbol is served as the reference point of the SLIV by default. When it is calculated that S+L exceeds the slot boundary, it falls back to the slot boundary served as the reference point of the SLIV, and S and S+L are re-determined according to the slot boundary.

In an embodiment, the reference point of the SLIV is determined according to the position of the PDCCH time domain symbol. Exemplarily, when the PDCCH starting symbol is located in first three symbols, the slot boundary is served as the reference point of the SLIV, and the PDCCH starting symbol is served as the reference point in other cases, which is not limited thereto.

In an embodiment, the step in which the reference point of the SLIV is determined according to the DCI format for scheduling the traffic channel includes a step described below. A TDRA table with the PDCCH related symbol served as the reference point of the SLIV is determined to be used in a first DCI format, the first DCI format includes one of: a new DCI format, a DCI format for scheduling a ultra reliable low latency communication (URLLC), a DCI format with a DCI size less than a preset threshold, or a DCI format with a time domain resource allocation domain size in DCI less than a preset threshold. In the embodiment, the reference point of the SLIV is determined according to the DCI format for scheduling the traffic channel. For example, in a case of using the first DCI format, the PDCCH starting symbol is served as the reference point of the SLIV, where the first DCI format may be one of the DCI format for scheduling the URLLC, a compact DCI format, the DCI format with the DCI size less than the predefined/preset threshold, or the DCI format with the time domain resource allocation domain size in the DCI less than the predefined/preset threshold.

Though the method for determining the reference point of the SLIV described in this embodiment, which is in a case of more than one reference point of the SLIV, it can avoid that data cannot be correctly received due to inconsistent understanding between the base station and the terminal, thus both the scheduling flexibility and overhead reduction of the time domain resource allocation can be respectively ensured under different conditions, and the low latency and high reliable traffic transmission is ensured. Meanwhile, if only the PDCCH starting symbol served as the reference point of the SLIV is supported, then a PDCCH with a starting symbol of a second or a third symbol in the slot cannot schedule a Type A PDSCH with a starting symbol earlier than the PDCCH starting symbol, but through flexibly selection of the reference point of the SLIV according to the method described in this embodiment, the above scheduling limitation can be avoided.

In an embodiment, the TDRA table with the PDCCH related symbol served as the reference point of the SLIV is illustrated. Taking an example of serving the PDCCH starting symbol as the PDCCH related symbol, a relationship between the reference point of the SLIV and the TDRA table is illustrated. When both the PDCCH starting symbol and the slot boundary served as the reference point of the SLIV exist at the same time, the TDRA table with the slot boundary served as the reference point of the SLIV is a table independently configured by the RRC, and the determination manner of the TDRA table with the PDCCH starting symbol served as the reference point of the SLIV includes one of steps described below.

An independently configured TDRA table is used. The used TDRA table includes a part of row indexes in the TDRA table with the slot boundary served as the reference point of the SLIV, such as first X row indexes, or a part of row indexes determined through a bitmap. In an embodiment, the starting symbol S in the obtained TDRA table with the PDCCH starting symbol served as the reference point of the SLIV may be reinterpreted, and S=0 by default. The used TDRA table is the TDRA table with the slot boundary served as the reference point of the SLIV, that is, the TDRA table with the PDCCH starting symbol served as the reference point of the SLIV is the same as the TDRA table with the slot boundary served as the reference point of the SLIV, and row indexes with the reference point of the SLIV in the invalid state are not indicated, or the UE does not expect to indicate the time domain resource allocation crossing the slot boundary. In the information determination method of this embodiment, through the determination of the TDRA table corresponding to different reference points of the SLIV, so that the base station and the terminal have a same understanding on the time domain resource allocation, and the terminal is avoided from receiving data incorrectly.

In an embodiment, for a TDRA table used for scheduling the PUSCH, a configuration manner of the reference point of the SLIV includes one of steps described below. The reference point of the SLIV is configured independently; the PDCCH related symbol is served as the reference point of the SLIV by default; when the PUSCH is scheduled for repetition transmission, it is determined that the reference point of the SLIV is the slot boundary, and when the PUSCH is scheduled for non-repetition transmission, it is determined that the reference point of the SLIV is the PDCCH related symbol. The determination manner of the reference point of the SLIV in the TDRA table used for scheduling the PUSCH is illustrated by taking an example of serving the PDCCH starting symbol as the PDCCH related symbol.

In an embodiment, the TDRA table used for scheduling the PUSCH may be determined by one of methods described below.

In an embodiment, the used TDRA table is determined according to whether the PUSCH is repeatedly transmitted. For example, different TDRA tables are used for the PUSCH repetition transmission and the PUSCH non-repetition transmission. The TDRA table used for scheduling the PUSCH non-repetition transmission uses the PDCCH starting symbol served as the reference point of the SLIV, and the TDRA table used for scheduling the PUSCH repetition transmission uses the slot boundary served as the reference point of the SLIV. For another example: one TDRA table is used, but a row index crossing the slot boundary is valid for the repetition transmission but invalid for the non-repetition transmission.

In an embodiment, for the PUSCH, the PDCCH ending symbol plus X symbols is served as the reference point by default for S=0, where X is not less than N2, that is, X is not less than a minimum period for preparing the PUSCH.

In an embodiment, when the PDSCH is scheduled, the PDCCH starting symbol is served as the reference point of the SLIV, and when the PUSCH is scheduled, the slot boundary is served as the reference point of the SLIV.

In an embodiment, when the possibility of more than one reference point of the SLIV exists, the more than one reference point of the SLIV includes at least one of: the PDCCH starting symbol, the PDCCH ending symbol, the starting symbol of the CORESET where the PDCCH is located, the ending symbol of the CORESET where the PDCCH is located; the slot boundary, where the slot boundary is the slot boundary determined by the scheduling timing K0 or K2; the starting symbol of the first available traffic channel, where the traffic channel is the PDSCH or the PUSCH; the PDCCH starting symbol plus X symbols, or the PDCCH ending symbol plus X symbols.

This embodiment discloses a method for determining the reference point of the SLIV according to a preset rule or a base station notification manner. One of these two manners is determined by at least one of methods described below.

The PDCCH starting symbol or the slot boundary is taken as an example for illustration, but is not limited thereto, which may be any two manners. In an embodiment, the used manner is determined according to whether the PUSCH is repeatedly transmitted. For example, the slot boundary is served as the reference point of the SLIV in a case of the repetition transmission, and the PDCCH starting symbol is served as the reference point of the SLIV in a case of the non-repetition transmission. In an embodiment, the PDCCH starting symbol is served as the reference point of the SLIV by default. When the PUSCH is scheduled for the repetition transmission, it falls back to the slot boundary served as the reference point of the SLIV, and S and S+L are re-determined by using the slot boundary.

Though the method described in this embodiment that different TDRA tables are respectively used for the PUSCH repetition transmission and the PUSCH non-repetition transmission, and when more than one reference point of the SLIV exists, one of the slot boundary and the PDCCH starting symbol is determined to be the reference point of the SLIV, which can avoid that data cannot be correctly received due to inconsistent understanding between the base station and the terminal, thus both the scheduling flexibility and overhead reduction of the time domain resource allocation are respectively ensured under different conditions, and low latency and high reliable traffic transmission is ensured.

In an embodiment, when a new DCI format is added, the manner for determining TDRA tables used for the time domain resource allocation in at least two different DCI formats includes one of steps described below. A second DCI format uses the RRC-configured TDRA table; while the first DCI format uses a default TDRA table; default TDRA tables are independently configured for the at least two different DCI formats; or the TDRA tables are independently configured for the at least two different DCI formats.

In an embodiment, taking an example of serving a DCI format used by the URLLC as the first DCI format (the first DCI format may be one of the DCI format for scheduling the URLLC, the compact DCI format, the DCI format with the DCI size less than the predefined/preset threshold or the DCI format with the time domain resource allocation domain size in the DCI less than the preset threshold), the second DCI format is a DCI format used by an enhanced mobile broadband (eMBB). In an embodiment, when the first DCI format is the DCI format used by the eMBB, the second DCI format is the DCI format used by the URLLC. The URLLC may reuse a DCI format same as the DCI format used by the eMBB, or use a new format. When the URLLC uses the new DCI format, the second DCI format and the first DCI format are different, that is, one of the second DCI format or the first DCI format is the new DCI format, and the other is an original DCI format. In this case, the TDRA tables used for the time domain resource allocation in the new DCI format and the original DCI format need to be determined. The method for determining the TDRA tables used for the time domain resource allocation in different DCI formats includes one of methods described below.

In an embodiment, one DCI format (such as the second DCI format) uses the RRC-configured TDRA table, and the other DCI format (such as the first DCI format) uses the default TDRA table. For example, taking the PDSCH scheduling as an example, the time domain resource allocation in a DCI format 1_1 of the R15 uses the RRC-configured TDRA table, and the time domain resource allocation in a DCI format 1_2 newly introduced by the R16 uses the default TDRA table. The default TDRA table may be configured as a table with less than 16 rows, so the time domain resource allocation in the DCI may have a bit size less than 4 bits. Alternatively, the PDCCH related symbol (such as the PDCCH starting symbol) is served as the reference point of the SLIV in the default TDRA table.

In an embodiment, different default TDRA tables are configured for different DCI formats. For example, taking the PDSCH scheduling as an example, the time domain resource allocation in the DCI format 1_1 of the R15 uses the default TDRA table configured with 16 rows, and the time domain resource allocation in the DCI format 1_2 newly introduced by the R16 uses the default TDRA table configured with 4 rows.

In the information determination method described in this embodiment, the TDRA table with the PDCCH starting symbol served as the reference point of the SLIV is determined through a specific DCI format, the resource allocation with a same length at multiple time domain locations can be implemented with a smaller overhead and the reliability is improved; or resources with multiple lengths are allocated with a same overhead and the scheduling flexibility is improved.

In an embodiment, an information determination method is provided, when a first DCI format and a second DCI format are used for scheduling a traffic channel, a method for determining a priority corresponding to the traffic channel includes one of steps described below. A priority corresponding to the first DCI format for scheduling the traffic channel is configured to be higher than a priority corresponding to the second DCI format used for scheduling the traffic channel, or a lowest priority corresponding to the first DCI format for scheduling the traffic channel is configured to be equal to a priority corresponding to the second DCI format used for scheduling the traffic channel.

In an embodiment, when the second DCI format is a DCI format used by the URLLC, the first DCI format is a DCI format used by the eMBB. In an embodiment, when the second DCI format is the DCI format used by the eMBB, the first DCI format is the DCI format used by the URLLC. The URLLC may reuse a DCI format same as the DCI format used by the eMBB, or use a new DCI format. When the URLLC uses the new DCI format, the second DCI format and the first DCI format are different, that is, one of the second DCI format or the first DCI format is the new DCI format, and the other is an original DCI format. In this case, the new DCI format and the original DCI format may be simultaneously used for scheduling the traffic channel. When a collision occurs in time domain, the priority of the traffic channel is determined and subsequent operations are performed according to the priority of the traffic channel. In the embodiment, the method for determining the priority of the traffic channel scheduled by different DCI formats includes one of steps described below.

In an embodiment, the priority of a traffic channel scheduled by the original DCI format is lower than a priority indicated by the priority in the new DCI format. For example, a priority corresponding to traffic scheduled by non-fallback DCI (i.e., a DCI format 0_1 and a DCI format 1_1) is lower than any priority indicated by the priority in the new DCI. That is, traffic scheduled by the non-fallback DCI of the R15 has the lowest priority in this case.

In an embodiment, the priority of the traffic channel scheduled by the original DCI format is equal to the lowest priority indicated by the priority in the new DCI format. For example, if the priority indicated in the new DCI has two cases, which are a high priority and a low priority and indicated by one bit, then the priority corresponding to the traffic channel scheduled by the non-fallback DCI of the R15 is equal to the low priority indicated by the priority in the new DCI. In the information determination method in this embodiment, through determination of the priority corresponding to the traffic channels scheduled by different DCI formats, so that the base station and the terminal can perform same subsequent operations according to the priority, thereby ensuring the consistent understanding between the base station and the terminal.

In the embodiment, the URLLC may reuse the DCI format same as the DCI format used by the eMBB, or use the new DCI format. When the URLLC uses the new DCI format, a number of DCI size types will increase. Therefore, how to determine a DCI size threshold (budget) and how to perform a DCI size alignment are urgent problems to be solved. The size threshold is a size budget. In the embodiment, for ease of description, a newly introduced DCI format for scheduling the PUSCH is defined as a DCI format 0_2, and a newly introduced DCI format for scheduling the PDSCH is defined as a DCI format 1_2.

In the R15, the DCI size budget is "3+1", that is, for a cell, the number of the DCI size types, which are handled by the UE. does not exceed 4, where a number of DCI size types, which are scrambled by a cell-radio network temporary identifier (C-RNTI), does not exceed 3. The size alignment in the related art includes steps described below. In step0: a format 0_0 is aligned with a format 1_0 in a common search space (CSS); in step1: the format 0_0 is aligned with the format 1_0 in a UE-specific search space (USS); in step2: if the format 0_1 in the UE-specific search space (USS) has a size equal to the format 0_0/1_0 in the USS, the format 0_1 is filled with 1 bit of zero padding, which is the same for a format 1_1; in step3: if "the number of the handled size types does not exceed 4, and the number of the DCI size types, which are scrambled by the C-RNTI, does not exceed 3" is satisfied, the process is over. Otherwise, a step4 is continued. In step4: the padding in the step2 is removed, the format 1_0/0_0 in the USS is re-calculated by using a CORESET0/an initial bandwidth part (BWP), the size of the format 0_0 is aligned with the format 1_0 in the USS, and in this case, the size of the format 1_0/0_0 in the CSS is aligned with the size of the format 1_0/0_0 in the USS. After the above steps, the UE does not expect that the number of the handled size types exceeds 4, where the number of types scrambled by the C-RNTI exceeds 3. Meanwhile, the UE does not expect either that the size of the format 0_0 and the size of the format 0_1 in the USS are same, or that the size of the format 1_0 and the size of the format 1_1 in the USS are same.

In an embodiment, an information determination method is provided. The method includes steps described below. When a new DCI format is added, the DCI size alignment operation is performed. The new DCI format includes: a format 0_2 for scheduling an uplink traffic channel and a format 1_2 for scheduling a downlink traffic channel; a size threshold is a number of DCI size types, which are handled by a user equipment (UE) in each cell, less than or equal to 4, and a number of DCI size types, which are scrambled by a cell-radio network temporary identifier (C-RNTI), does not exceed 3; or a size threshold is a number of DCI size types, which are handled by the UE in each cell, less than or equal to 5, and a number of DCI size types, which are scrambled by the C-RNTI, does not exceed 4.

In an embodiment, the URLLC DCI includes the size of the format 0_2 and the size of the format 1_2. In an embodiment, a DCI format for scheduling URLLC uplink traffic is the DCI format 0_2, and a DCI format for scheduling URLLC downlink traffic is the DCI format 1_2, that is, URLLC DCI UL is the format 0_2, and URLLC DCI DL is the format 1_2. When the size budget is not allowed to be increased, for example, the size budget still maintains to be "3+1", that is, for a cell, the number of the DCI size types, which are handled by the UE, does not exceed 4, and the number of the DCI size types, which are scrambled by the C-RNTI, does not exceed 3. The method for performing the size alignment in this case includes one of steps described below.

In an embodiment, when the size threshold is the number of the DCI size types, which are handled by the UE in each cell, less than or equal to 4, and the number of the DCI size types, which are scrambled by the C-RNTI, does not exceed 3, the step in which the DCI size alignment operation is performed includes steps described below. The size of the format 0_0 is aligned with the size of the format 1_0, the size of the format 0_1 is aligned with the size of the format 1_1, and the size of the format 0_2 is aligned with the size of the format 1_2. In the embodiment, the size of the format 0_0 of fallback DCI (i.e., the DCI format 0_0 and the DCI format 1_0) is aligned with the size of the format 1_0 of the fallback DCI, and the size of the format 0_1 of non-fallback DCI is aligned with the size of the format 1_1 of the non-fallback DCI, and the size of the format 0_2 of the URLLC DCI is aligned with the size of the format 1_2 of the URLLC DCI, i.e., there are totally three types. If the three DCI formats have an equal size, zero padding needs to be added. In an embodiment, the method does not allow the size of the URLLC DCI to be the same as the DCI size of the R15. Exemplarily, the DCI size alignment includes steps described below. In step0: the size of the format 0_0 is aligned with the size of the format 1_0 in the CSS; in step1: the size of the format 0_0 is aligned with the size of the format 1_0 in the USS; in step2: if the size of format 0_1 in the USS is equal to the size of the format 0_0/1_0 in the USS, then 1 bit of the zero padding is added to the format 0_1, which is the same for the format 1_1, the format 0_2, and the format 1_2; in step3: if "the number of the handled size types does not exceed 4, and the number of the DCI size types scrambled by the C-RNTI does not exceed 3" is satisfied, the DCI size alignment operation is over. Otherwise, a step4 is continued. In step4: the padding in the step2 is removed, the format 1_0/0_0 in the USS is re-calculated by using a CORESET0/initial BWP, the size of the format 0_0 is aligned with the size of the format 1_0 in the USS, and in this case, the size of format 1_0/0_0 in the CSS is aligned with the size of the format 1_0/0_0 in the USS. In step5: if "the number of the handled size types does not exceed 4, and the number of the DCI size types, which are scrambled by the C-RNTI, does not exceed 3" is satisfied, the DCI size alignment operation is over. Otherwise, a step6 is continued. In step6: the format 0_2 is aligned with the format 1_2 in the USS. In step 7: if "the number of the handled size types does not exceed 4, where the number of the DCI size types, which are scrambled by the C-RNTI, does not exceed 3" is satisfied, the DCI size alignment operation is over. Otherwise, a step8 is continued. In step8: the format 0_1 is aligned with the format 1_1 in the USS. After the above steps, the UE does not expect that the number of the handled size types exceeds 4, where the number of the DCI size types, which are scrambled by the C-RNTI, exceeds 3. The UE does not expect either that the format 0_0 and the format 0_1 have a same size as the format 0_2 in the USS, and or that the format 1_0 and the format 1_1 have a same size as the format 1_2 in the USS.

In an embodiment, when the size threshold is the number of the DCI size types, which are handled by the UE in each cell, less than or equal to 4, and the number of the DCI size types, which are scrambled by the C-RNTI, does not exceed 3, the step in which the DCI size alignment operation is performed includes steps described below. The size of the format 0_2 and the size of the format 1_2 are aligned to a first type size, the first type size is aligned with one of the size of the fallback DCI or the size of the non-fallback DCI. In an embodiment, the size of the URLLC DCI is aligned with one of the size of the fallback DCI or the size of the non-fallback DCI of the R15, i.e., there is no more than 3 types, the size of the format 0_2 and the size of the format 1_2 of the URLLC DCI are aligned to the first type size, which is equivalent to the size of the URLLC DCI UL and the size of the URLLC DCI DL aligned to the first type size. Then, the first type size is aligned with one of the size of the fallback DCI or the size of the non-fallback DCI, so as to achieve the effect that the number of the DCI size types does not exceed 3.

In an embodiment, the step in which the first type size is aligned with one of the size of the fallback DCI or the size of the non-fallback DCI includes one of steps described below. The first type size is configured to be aligned to one of the size of the fallback DCI or the size of the non-fallback DCI according to higher layer signaling; or the first size is aligned to one of the size of the fallback DCI or the size of the non-fallback DCI according to a size closest principle.

In an embodiment, the first size is configured to be aligned with one format of the R15 according to the higher layer signaling. Taking an example of aligning the first type size to the size of the fallback DCI of the R15, the corresponding DCI size alignment includes following steps, in step0: the format 0_0 is aligned with the format 1_0 in the CSS, in step1: the format 0_0 is aligned with the format 1_0 in the USS, in step2: if the format 0_1 in the USS has an equal size as the format 0_0/1_0 in the USS, 1 bit of the zero padding is performed on the format 0_1, which is the same for the format 1_1. The format 0_2 and the format 1_2 are not processed with any operation. In step3: if "the number of the size types handled at the same time does not exceed 4, where the number of the C-RNTI scrambled DCI size types does not exceed 3" is satisfied, the DCI size alignment operation is over. Otherwise, a step4 is continued. In step4: the format 0_2 is aligned with the format 1_2 in the USS. In step5: if "the number of the size types handled at the same time does not exceed 4, where the number of the DCI size types, which are scrambled by the C-RNTI, does not exceed 3" is satisfied, the DCI size alignment operation is over. Otherwise, a step6 is continued. In step6: the format 0_2/1_2 in the USS is aligned with the format 0_0/1_0 in the USS. In step7: if "the number of the size types handled at the same time does not exceed 4, where the number of the C-RNTI scrambled DCI size types does not exceed 3" is satisfied, the DCI size alignment operation is over. Otherwise, a step8 is continued. In step8: the padding in the step2 is removed, the format 1_0/0_0 in the USS is re-calculated by using the CORESET0/initial BWP, and the size of the format 0_0 is aligned with the size of the format 1_0 in the USS. In this case, the size of the format 1_0/0_0 in the CSS is aligned with the size of the format 1_0/0_0 in the USS, and the padding in step6 is removed. The format 0_2/1_2 is re-aligned with the format 0_0/1_0. After the above steps, the UE does not expect that the number of the size types handled at the same time exceeds 4, where the number of the C-RNTI scrambled DCI size types exceeds 3. The UE does not expect either that the format 0_0/0_2 in the USS has a same size as the format 0_1 in the USS, or that the format 1 0/1_2 in the USS has a same size as the format 1_1 in the USS.

In an embodiment, the step in which the first type size is aligned to one of the size of the fallback DCI or the size of the non-fallback DCI according to the size closest principle includes steps described below. When a size of DCI for scheduling a traffic channel is less than the size of the fallback DCI, an operation of aligning the size of the URLLC DCI to the size of the fallback DCI is not performed. When the size of the DCI for scheduling the traffic channel is greater than the size of the fallback DCI, the operation of aligning to one of the size of the fallback DCI or the size of the non-fallback DCI is performed according to the size closest principle. In the embodiment, when the size of the URLLC DCI is less than the size of the fallback DCI, the operation of aligning the URLLC DCI to the fallback DCI is not performed. When the size of the URLLC DCI is greater than the size of the fallback DCI, the size alignment is performed according to the size closest principle. Exemplarily, when the size alignment operation is performed according to the size closest principle, the corresponding DCI size alignment includes steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, while the format 0_2 and the format 1_2 are not processed with any operation. In step3: if "the number of the size types handled at the same time does not exceed 4, where the number of the C-RNTI scrambled DCI size types does not exceed 3" is satisfied, the DCI size alignment operation is over. Otherwise, a step4 is continued. In step4: the format 0_2 is aligned with the format 1_2 in the USS. In step5: if "the number of the size types handled at the same time does not exceed 4, and the number of the C-RNTI scrambled DCI size types does not exceed 3" is satisfied, the DCI size alignment operation is over. Otherwise, a step6 is continued. In step6: the size of the URLLC DCI is aligned to one of the size of the fallback DCI or the size of the non-fallback DCI in the R15 by using the size closest principle, i.e., according to a condition in table 4 satisfied by the DCI size. Table 4 is a relationship table for performing the size alignment according to the size closest principle provided by an embodiment of the present application. Exemplarily, it is assumed that the size of the URLLC DCI is N1 bits, the size of the fallback DCI is M bits, the DCI size of the non-fallback DCI in one scheduling direction is P bits, and the DCI size of the non-fallback DCI in the other scheduling direction is Q bits, where M is about 40 bits, P and Q are about 60 bits, the scheduling direction refers to the UL and the DL, and it is assumed that the size of the URLLC DCI will not be greater than a size of the eMBB DCI.

TABLE 4

Relationship table for performing the size alignment according to the size closest principle

| Condition | Alignment manner |
| --- | --- |
| N1 < M < P or Q (such as N1 = 30) | Align the URLLC DCI to the fallback DCI |
| M < N1 << P or Q (such as N1 = 45) | Align the fallback DCI to the URLLC DCI |
| M < N1 < P or Q (such as N1 = 55) | Align the URLLC DCI to the non-fallback DCI with a size of P or Q |

After the above steps, the UE does not expect that the number of the size types handled at the same time exceeds 4, where the number of the C-RNTI scrambled DCI size types exceeds 3. When the size of the URLLC DCI is the same as the size of the fallback DCI, the UE does not expect either the size of the format 0_0/0_2 to be the same as the size of the format 0_1 in the USS, or the size of the format 1_0/1_2 to be the same as the size of the format 1_1 in the USS; or when the size of the URLLC DCI is the same as the size of the format 0_1, the UE does not expect the size of the format 0_0 to be the same as the size of the format 0_1/0_2/1_2 in the USS; or when the size of the URLLC DCI is the same as the size of the format 1_1, the UE does not expect the size of the format 1_0 to be the same as the size of the format 1_1/0_2/1_2 in the USS. Through the DCI size alignment method described in this embodiment, the base station and the terminal can perform a same size alignment method on the premise of ensuring the DCI size budget requirement, so that the base station and the terminal have the consistent understanding, which also does not exceed the processing capacity of the terminal.

In an embodiment, when the size threshold is the number of the DCI size types, which are handled by the UE in each cell, less than or equal to 4, and the number of the DCI size types, which are scrambled by the C-RNTI, does not exceed 3, the step in which the DCI size alignment operation is performed includes a step described below, the number of the DCI size types handled by the UE in each cell is less than or equal to 4 within a time range of each time span, where the number of the C-RNTI scrambled DCI size types does not exceed 3. In the embodiment, when the size budget is not allowed to be increased, for example, the size budget still maintains to be "3+1", that is, for a cell, the number of the DCI size types handled by the UE does not exceed 4, where the number of the C-RNTI scrambled DCI size types does not exceed 3. In this case, the method of performing the size alignment remains unchanged, but the size alignment is performed at a smaller time granularity. In an embodiment, "3+1" is maintained at the granularity of per span, that is, for a cell, the number of the size types, which are handled by the UE per span, does not exceed 4, and the number of the C-RNTI scrambled DCI size types per span does not exceed 3. The number of the overall handled DCI size types may be more than 4. Through the method for maintaining the DCI size budget to be unchanged in this embodiment, it ensures the premise that the base station and the terminal can maintain the DCI size budget to be unchanged at the granularity of per span, so that the base station and the terminal have the consistent understanding, which also does not exceed the processing capacity of the terminal.

When the size budget is allowed to be increased, for example, the size budget may be increased to "4+1", that is, for a cell, the number of the DCI size types, which are handled by the UE, does not exceed 5, and the number of the DCI size types, which are scrambled by the C-RNTI, does not exceed 4.

In an embodiment, when the size threshold is the number of the DCI size types, which are handled by the UE in each cell, less than or equal to 5, and the number of the DCI size types, which are scrambled by the C-RNTI, does not exceed 4, the step in which the DCI size alignment operation is performed includes one of steps described below. The alignment operation is performed on the size of the DCI format 0_2 for scheduling the traffic channel and the size of the DCI format 1_2 for scheduling the traffic channel. One of the size of the DCI format 0_2 for scheduling the traffic channel or the size of the DCI format 1_2 for scheduling the traffic channel is aligned to the size of the fallback DCI. One of the size of the DCI format 0_2 for scheduling the traffic channel or the size of the format 1_2 for scheduling the traffic channel is aligned to the size of the non-fallback DCI. A size of non-fallback UL DCI is aligned with a size of non-fallback DL DCI. The size of the DCI for scheduling the traffic channel is aligned to one of the size of the fallback DCI or the size of the non-fallback DCI according to a preconfigured mode. The size of DCI for scheduling the traffic channel is aligned to one of the size of the fallback DCI or the size of the non-fallback DCI according to a preset rule.

In an embodiment, the step in which the alignment operation is performed on the size of the DCI format 0_2 for scheduling the traffic channel and the size of the DCI format 1_2 for scheduling the traffic channel, that is, the size alignment operation is performed on the URLLC DCI format 0_2 and the URLLC DCI format 1_2. Exemplarily, the corresponding DCI size alignment may include steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, while the format 0_2 and the format 1_2 are not processed with any operation. In step3: if "the number of the handled size types is not more than 5, and the number of the C-RNTI scrambled DCI size types does not exceed 4" is satisfied, the DCI size alignment operation is over. Otherwise, a step4 is continued. In step4: the format 0_2 in the USS is aligned with the format 1_2 in the USS. In step5: if "the number of the handled size types is not more than 5, and the number of the C-RNTI scrambled DCI size types does not exceed 4" is satisfied, the DCI size alignment operation is over. Otherwise, a step6 is continued. In step6: the padding in the step2 is removed, the format 1_0/0_0 in the USS is re-calculated by using the CORESET0/initial BWP, and the size of the format 0_0 is aligned with the size of the format 1_0 in the USS. In this case, the size of the format 1_0/0_0 in the CSS is aligned with the size of the format 1_0/0_0 in the USS. After the above steps, the UE does not expect that the number of the handled size types exceeds 5, where the number of the C-RNTI scrambled DCI size types exceeds 4. The UE does not expect either that the size of the format 0_0 and the size of the format 0_1 to be the same as the size of the format 0_2 in the USS, or that the size of the format 1_0 and the size of the format 1_1 to be the same as the size of the format 1_2 in the USS. The step6 and the step4 may also be exchanged.

In an embodiment, the size of the DCI format 0_2 for scheduling the traffic channel and the size of the DCI format 1_2 for scheduling the traffic channel are aligned to the size of the fallback DCI, that is, one piece of URLLC DCI is aligned to the fallback DCI. For example, the URLLC DCI with a size close to 40 bits is selected to be aligned to the fallback DCI, the corresponding DCI size alignment includes steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1. The format 0_2 and the format 1_2 are not processed with any operation. In step3: if "the number of the handled size types is not more than 5, and the number of the C-RNTI scrambled DCI size types does not exceed 4" is satisfied, the DCI size alignment operation is over. Otherwise, a step4 is continued. In step4: the padding in the step2 is removed, the format 1_0/0_0 in the USS is re-calculated by using the CORESET0/initial BWP, and the size of the format 0_0 is aligned with the size of the format 1_0 in the USS. In this case, the size of the format 1_0/0_0 in the CSS is aligned with the size of the format 1_0/0_0 in the USS. In step5, if "the number of the handled size types is not more than 5, and the number of the C-RNTI scrambled DCI size types does not exceed 4" is satisfied, the DCI size alignment operation is over. Otherwise, a step6 is continued. (For example, if only the DL or the UL needs to the URLLC scheduling, then step5 is served an end step). In step6: a format with a smaller size between the format 0_2 and the format 1_2 is aligned with the size of the format 1_0/0_0. After the above steps, the UE does not expect that the number of the handled size types exceeds 5, where the number of the C-RNTI scrambled DCI size types exceeds 4. When the size of the format 1_2 is aligned with the size of the fallback DCI, the UE does not expect the size of the format 0_0 and the size of the format 0_1 to be the same as the size of the format 0_2 in the USS. When the size of the format 0_2 is aligned with the size of the fallback DCI, the UE does not expect the size of the format 1_0 and the size of the format 1_1 to be the same as the size of the format 1_2 in the USS. In the above steps, the step6 and step4 may also be exchanged. But after the exchange of the step6 and step4, the description in the step4 needs to add that "the padding before the URLLC DCI is removed, and the format with a smaller size between the format 0_2 and the format 1_2 (i.e., min{size of format 0_2, size of format 1_2}) is re-aligned with the size of the format 1_0/0_0".

In an embodiment, the size of the DCI format 0_2 for scheduling the traffic channel and the size of the DCI format 1_2 for scheduling the traffic channel are aligned to the size of the non-fallback DCI, that is, one piece of URLLC DCI is aligned to one piece of the non-fallback DCI of the R15. For example, if the size of the URLLC DCI is greater than the size of the fallback DCI, and one piece of the URLLC DCI having a larger size is selected to be aligned to the size of one piece of the non-fallback DCI of the R15. In an embodiment, the URLLC DL DCI is aligned to the eMBB UL DCI, or the URLLC UL DCI is aligned to the eMBB DL DCI. Exemplarily, the corresponding DCI size alignment includes steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, while format 0_2 and the format 1_2 are not processed with any operation. In step3: if "the number of the handled size types does not exceed 5, where the number of the C-RNTI scrambled DCI size types does not exceed 4" is satisfied, the DCI size alignment operation is over. Otherwise, a step4 is continued. In step4: the padding in the step2 is removed, the format 1_0/0_0 in the USS is re-calculated by using the CORESET0/initial BWP, and the size of the format 0_0 is aligned with the size of the format 1_0 in the USS. In this case, the size of the format 1_0/0_0 in the CSS is aligned with the size of the format 1_0/0_0 in the USS. In step5, if "the number of the handled size types does not exceed 5, and the number of the C-RNTI scrambled DCI size types does not exceed 4" is satisfied, the DCI size alignment operation is over. Otherwise, a step 6 is continued (for example, only the DL or the UL needs the URLLC scheduling, and the process ends after the step5). In step6: a format with a larger size between the format 0_2 and the format 1_2 (i.e., max {size of format 0_2, size of format 1_2}) is aligned with the size of the format 1_1 or format 0_1. After the above steps, the UE does not expect that the number of the handled size types exceed, and the number of the C-RNTI scrambled DCI size types exceeds 4. When the size of the format 1_2 is aligned with the size of the format 0_1, the UE does not expect the size of the format 0_0 to be the same as the size of the format 0_1 and the size of the format 0_2 in the USS. When the size of the format 0_2 is aligned with the size of the format 1_1, the UE does not expect the size of the format 1_0 and the size of the format 1_1 to be the same as the size of the format 1_2 in the USS. In the above steps, the step6 and the step4 may also be interchanged. But after the exchange of the step6 and the step4, the description in the step4 needs to add that "the padding before the URLLC DCI is removed, and the format with a larger size between the format 0_2 and the format 1_2 (i.e., max{size of format 0_2, size of format 1_2}) is re-aligned with the size of the format 1_1 or format 0_1" accordingly.

In an embodiment, the size of the non-fallback UL DCI is aligned with the size of the non-fallback DL DCI, that is, the non-fallback UL DCI of the R15 is aligned with the non-fallback DL DCI of the R15. Exemplarily, the corresponding DCI size alignment includes steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, the format 0_2 and the format 1_2. In step3: if "the number of the handled size types does not exceed 5, and the number of the C-RNTI scrambled DCI size types does not exceed 4" is satisfied, the DCI size alignment operation is over. Otherwise, a step4 is continued. In step4, the padding in the step2 is removed. The format 1_0/0_0 in the USS is re-calculated by using a CORESET0/initial BWP, the size of format 0_0 in the USS is aligned to the format 1_0 in the USS, and in this case, the size of format 1_0/0_0 in the CSS is aligned to size of format 1_0/0_0 in the USS. In step5: if "the number of the handled size types does not exceed 5, and the number of the C-RNTI scrambled DCI size types does not exceed 4" is satisfied, the DCI size alignment operation is over. Otherwise, a step6 is continued. In step6: the format 0_1 is aligned with the format 1_1 in the USS. After the above steps, the UE does not expect that the number of the handled size types exceeds 5, where the number of the C-RNTI scrambled DCI size types exceeds 4. The UE does not expect either that the size of the format 0_0 and the size of the format 0_1 are the same as the size of the format 0_2 in the USS, or that the size of the format 1_0 and the size of the format 1_1 are the same as the size of the format 1_2 in the USS.

In an embodiment, the size of the DCI for scheduling the traffic channel is aligned to one of the size of the fallback DCI or the size of the non-fallback DCI according to the preconfigured mode, that is, the URLLC DCI may be aligned to one of the R15 formats in the configuration manner. That is, the RRC configures a format which the size of the URLLC DCI is aligned to. Exemplarily, the corresponding DCI size alignment may include steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, the format 0_2 and the format 1_2. In step3: if "the number of the handled size types does not exceed 5, and the number of the C-RNTI scrambled DCI size types does not exceed 4" is satisfied, the DCI size alignment operation is over. Otherwise, a step4 is continued. In step4, the padding in the step2 is removed. The format 1_0/0_0 in the USS is re-calculated by using a CORESET0/initial BWP, the size of the format 0_0 is aligned to the format 1_0 in the USS, and in this case, the size of the format 1_0/0_0 in the CSS is aligned to size of the format 1_0/0_0 in the USS. In step5: if "the number of the handled size types does not exceed 5, and the number of the C-RNTI scrambled DCI size types does not exceed 4" is satisfied, the DCI size alignment operation is over. Otherwise, a step6 is continued. In step6: according to the RRC configuration, one of the size of the URLLC DL DCI or the size of the URLLC UL DCI is aligned to one of the R15 formats configured by the RRC. After the above steps, the UE does not expect that the number of the handled size types exceeds 5, and the number of the C-RNTI scrambled DCI size types exceeds 4. When the format 0_2 does not use the zero padding operation, the UE does not expect that the size of the format 0_0 and the size of the format 0_1 are the same as the size of the format 0_2 in the USS, and when the format 1_2 does not use the zero padding operation, the UE does not expect that the size of the format 1_0 and the size of the format 1_1 are the same as the size of the format 1_2 in the USS.

In an embodiment, the size of DCI for scheduling the traffic channel is aligned to one of the size of the fallback DCI or the size of the non-fallback DCI according to the preset rule. That is, the size of the URLLC DCI is aligned to one of the R15 formats according to the preset rule, for example, the preset rule may be: subject to closest to the size. In an embodiment, when the size of the URLLC DCI is less than the size of the fallback DCI, an operation of alignment to the fallback DCI is performed on the URLLC DCI; when the size of the URLLC DCI is greater than the size of the fallback DCI, the size alignment operation is performed according to the size closest principle. Exemplarily, the corresponding DCI size alignment may include steps described below. In step0: the format 0_0 is aligned with the format 1_0 in the CSS. In step1: the format 0_0 is aligned with the format 1_0 in the USS. In step2: if the size of the format 0_1 in the USS is equal to the size of the format 0_0/1_0 in the USS, 1 bit of the zero padding is performed on the format 0_1, which is the same for the format 1_1, the format 0_2 and the format 1_2. In step3: if "the number of the handled size types does not exceed 5, and the number of the C-RNTI scrambled DCI size types does not exceed 4" is satisfied, the DCI size alignment operation is over. Otherwise, a step4 is continued. In step4, the padding in the step2 is removed. The format 1_0/0_0 in the USS is re-calculated by using a CORESET0/initial BWP, the size of format 0_0 is aligned to the format 1_0 in the USS, and in this case, the size of the format 1_0/0_0 in the CSS is aligned to the size of the format 1_0/0_0 in the USS. In step5: if "the number of the handled size types does not exceed 5, and the number of the scrambled by DCI size types does not exceed 4" is satisfied, the DCI size alignment operation is over. Otherwise, a step6 is continued. In step6: according to the size closest principle, that is, according to a condition in table 5 satisfied by the DCI size, the size of the URLLC DCI is aligned to one of the size of the fallback DCI or the size of the non-fallback DCI of the R15.

Table 5 is a relationship table for performing the size alignment according to the size closest principle provided by an embodiment of the present application. Exemplarily, it is assumed that a DCI size of the URLLC DCI in one scheduling direction is N1 bits, and a DCI size of the URLLC DCI in the other scheduling direction is N2 bits, the size of the fallback DCI is M bits, a DCI size of one scheduling direction of the non-fallback DCI is P bits, and a DCI size of the other scheduling direction of the non-fallback DCI is Q bits, where M is about 40 bits, P and Q are about 60 bits, and the scheduling direction may include the UL and the DL, and it is assumed that the size of the URLLC DCI is not greater than the size of the eMBB DCI.

TABLE 5

Relationship table for performing the size alignment according to the size closest principle

| Condition | Alignment manner |
| --- | --- |
| N1 < N2 << M < P or Q (such as N1 = 28, N2 = 30) | Align the URLLC DCI format with a size of N1 to the URLLC DCI format with a size of N2 |
| N1 << N2 < M < P or Q (such as N1 = 28, N2 = 38) | Align the URLLC DCI format with a size of N2 to the fallback DCI |
| N1 < M << N2 << P or Q (such as N1 = 38, N2 = 50) | Align the URLLC DCI format with a size of N1 to the fallback DCI |
| N1 << M < N2 << P or Q (such as N1 = 28, N2 = 42) | Align the fallback DCI to the URLLC DCI format with a size of N2 |
| N1 << M << N2 < P or Q (such as N1 = 28, N2 = 58) | Align the URLLC DCI format with a size of N2 to the non-fallback DCI |
| M < N1 << N2 << P or Q (such as N1 = 42, N2 = 50) | Align the fallback DCI to the URLLC DCI format with a size of N1 |
| M << N1 < N2 << P or Q (such as N1 = 48, N2 = 50) | Align the URLLC DCI format with a size of N1 to the URLLC DCI format with a size of N2 |
| M << N1 << N2 < P or Q (such as N1 = 48, N2 = 58) | Align the URLLC DCI format with a size of N2 to the non-fallback DCI |

Illustration: meaning of A << B < C in the table is (B − A) > (C − B)

After the above steps, the UE does not expect that the number of the handled size types exceeds 5, and the number of the C-RNTI scrambled DCI size types exceeds 4. When the format 0_2 does not use the zero padding operation, the UE does not expect that the size of the format 0_0 and the size of the format 0_1 are the same as the size of the format 0_2 in the USS, and when the format 1_2 does not use the zero padding operation, the UE does not expect that the size of the format 1_0 and the size of the format 1_1 are the same as the size of the format 1_2 in the USS. Through the DCI size alignment method described in this embodiment, it is ensured that the base station and the terminal perform a same size alignment method on the premise of ensuring the DCI size budget requirements, so that both the base station and the terminal can have the consistent understanding, which also does not exceed the processing capacity of the terminal.

In an embodiment, the information determination method further includes a step described below, a format identification indication field is configured for at least one DCI format. In the embodiment, the format identification indication field is used for indicating one of DCI formats. For example, when the format identification indication field is a 1-bit indication field, 0 denotes the UL DCI and 1 denotes the DL DCI. For another example, when the format identification indication field is a 2-bit indication field, where 00 denotes the format 0_1, 01 denotes the format 1_1, 10 denotes the format 0_2, and 11 denotes the format 1_2. For another example, when the format identification indication field is a 2-bit indication field, 00 denotes the format 0_1, 01 denotes the format 0_2, 10 denotes the format 1_1, and 11 denotes the format 1_2. In the embodiment, when the size of the new DCI format is the same as the size of the fallback DCI (or the size of the non-fallback DCI), the method for distinguishing different DCI formats may include a step described below, an identification bit field is configured for two DCI formats performing the DCI alignment. In an embodiment, the identification bit field may be 1 bit, which is used for indicating the new DCI format or the original DCI format; or the indication bit field may be 2 bits, which are used for indicating one of the DL of the new DCI format, the UL of the new DCI format, the DL of the original DCI format and the UL of the original DCI format. In an embodiment, it is allowable to configure the format identification indication field for all DCI formats, and it is allowed to configure the format identification indication field for the newly added DCI format, and it is allowed to configure the format identification indication field for the newly added DCI format and the fallback DCI, and it is allowed to configure the format identification indication field for the two DCI formats performing the DCI alignment operation.

In an embodiment, the information determination method further includes a step described below, two DCI formats for performing the DCI alignment operation is distinguished by a format indication flag. In an embodiment, when the size of the new DCI format is the same as the size of the fallback DCI (or the size of the non-fallback DCI), the method for distinguishing different DCI formats may include steps described below, the eMBB UL DCI to be aligned with the URLLC DL DCI, and the eMBB DL DCI to be aligned with the URLLC UL DCI are distinguished through a format indication flag carried in the DCI format. For the non-fallback DCI, since the size of the UL and the size of the DL do not need to be aligned, that is, when the size of the eMBB DL DCI is N bits, the size of the eMBB UL DCI is M bits, and M is not equal to N, then the URLLC DL DCI (where the URLLC does not require to be high reliable and the size does not require to be greater than the size of the fallback) is aligned to M bits, and the URLLC UL DCI is aligned to N bits. That is, DCI with the same size of M bits indicates the URLLC when flag=DL, and indicates the eMBB when flag=UL; DCI with the same size of N bits indicates the eMBB when flag=DL, and indicates the URLLC when flag=UL. Through the method for distinguishing DCI formats with a same size in this embodiment, it is ensured that the terminal can accurately know the specific DCI format under the premise of the same size, so that both the base station and the terminal can have the consistent understanding at the same time without increasing the UE processing complexity.

In an embodiment, exemplarily, for a terminal of the URLLC of the R16, compared to the R15, a maximum number of blind decode (BD threshold) and/or a maximum number of non-overlapping CCEs for channel estimation (CCE threshold) are increased, and the BD threshold and/or CCE threshold are defined at a granularity of span. In an embodiment, an increase of the CCE threshold is illustrated by taking the CCE threshold as an example. For a manner of increasing the BD threshold, following methods may also be used, which will not be repeated here.

In an embodiment, the method for determining a span may include steps described below, a time span pattern in the slot is determined through a candidate set of (X, Y) reported by the UE, a PDCCH control resource set (PDCCH CORESET) and a search space. No overlap is allowed between spans, and a spacing between starts of two spans is not less than X symbols. A span duration=Maximum(a configured maximum CORESET duration, a minimum Y reported by the UE), only a last span in the span pattern may be a shorter duration. A number of spans does not exceed a value of rounding down 14/X (that is, floor(14/X)), where X is the minimum value of X reported by the UE. Exemplarily, (X, Y) includes at least one of: (1, 1), (2, 1), (2, 2), (4, 1), (4, 2), (4, 3), (7, 1), (7, 2), (7, 3). Exemplarily, a candidate set of (X, Y) reported by the UE includes at least one of: {(7, 3), (4, 3) and (7, 3), (2, 2) and (4, 3) and (7, 3)}.

5 In the embodiment, the control channel element (CCE) threshold (that is C CCEs) corresponding to each (X, Y) is determined through one of predefinition, DCI dynamic notification or RRC configuration. Exemplarily, table 6, table 7, and table 8 are relationship tables between X, Y, and C configured by the RRC provided by the embodiments of the present application.

TABLE 6

| X | Y | C |
|---|---|---|
| 2 | 2 | 16 |
| 4 | 3 | 36 |
| 7 | 3 | 56 |

TABLE 7

| X | Y | C |
|---|---|---|
| 1 | 1 | 16 |
| 2 | 2 | 16 |
| 4 | 3 | 36 |
| 7 | 3 | 56 |

TABLE 8

| X | Y | C |
|---|---|---|
| 1 | 1 | 16 |
| 2 | 1 | 16 |
| 2 | 2 | 16 |
| 4 | 1 | 16 |
| 4 | 2 | 24 |
| 4 | 3 | 36 |
| 7 | 1 | 36 |
| 7 | 2 | 48 |
| 7 | 3 | 56 |

In an embodiment, after the UE reports different (X, Y) sets, how to determine the maximum number of CCEs (i.e., C) of each span is an urgent problem to be solved.

In the embodiment, an information determination method is provided to determine the CCE threshold. In an embodiment, the information determination method includes a step described below. A maximum number of CCEs (marked as max CCE per span) of each time span is determined.

In an embodiment, the step in which the maximum number of CCEs of each span is determined includes one of steps described below. The maximum number of CCEs of each span is determined according to a number of spans in a time span pattern, a number of actual spans in a slot, and a number of limited CCEs of each span. The maximum number of CCEs of each span is determined according to a number of limited CCEs in each slot, a number of actual spans in a slot, and a number of limited CCEs of each span.

In an embodiment, the step in which the maximum number of CCEs of each span is determined includes a step described below. The maximum number of CCEs of each span is determined according to the number of spans in the time span pattern, the number of actual spans in the slot, and the number of limited CCEs of each span. In the embodiment, the maximum number of CCEs of each span is determined by the number of spans in the time span pattern (marked as number of spans in span pattern), the number of actual spans/a number of non-empty spans in the slot (marked as member of monitoring spans in slot j or number of non-empty spans in slot j) and the number of limited CCEs of each span (marked as CCE limit per span). Exemplarily, $$\max CCE \text{ per span} =$$

$$\text{floor}\left(\frac{CCE \text{ limit per span} \cdot \text{number of spans in span pattern}}{\text{number of monitoring spans in slot } j}\right)$$

or, $$\text{floor}\left(\frac{CCE \text{ limit per span} \cdot \text{number of spans in span pattern}}{\text{number of non-empty spans in slot } j}\right).$$

In an embodiment, the step in which the maximum number of CCEs of each span is determined includes a step described below. The maximum number of CCEs of each span is determined according to the number of limited CCEs in each slot, the number of actual spans in the slot, and the number of limited CCEs of each span. In the embodiment, the maximum number of CCEs of each span is determined by the number of limited CCEs in each slot (CCE limit per slot), the number of actual spans/a number of non-empty spans in the slot (marked as number of monitoring spans in slot j or number of non-empty spans in slot j) and the number of limited CCEs of each span (marked as ('CE limit per span). Exemplarily $$\max CCE \text{ per span} =$$

$$\max\left(CCE \text{ limit per span, floor}\left(\frac{CCE \text{ limit per slot}}{\text{number of monitoring spans in slot } j}\right)\right)$$

or $$\max\left(CCE \text{ limit per span, floor}\left(\frac{CCE \text{ limit per slot}}{\text{number of non-empty spans in slot } j}\right)\right).$$

In an embodiment, a value of the CCE limit per slot may be obtained from multiplying the CCE limit per span by the number of spans in the span pattern.

In an embodiment, the maximum number of CCEs of each span may be determined by the number of limited CCEs of each span (CCE limit per span). In an embodiment, max CCE per span=CCE limit per span. In an embodiment, the maximum number of CCEs of each span is respectively determined according to whether a capacity of an empty span in the slot may be shared with other actual spans. When sharing with other actual spans is not allowed, the maximum number of CCEs of each time span may be determined by the number of limited CCEs of each span. When sharing with other actual spans is allowed, any other manner of determining the maximum number of CCEs of each span may be used except manner of determining the maximum number of CCEs of each span through the number of limited CCEs of each span.

The information determination method in this embodiment obtains the maximum number of CCEs of each span through the number of limited CCEs of each span, which is applicable to different scenarios, for example, the capacity of the empty span in the slot may be shared with other actual spans, or the capacity of the empty span in the slot may not be shared with other actual spans, which increases the scheduling flexibility without exceeding the UE capability.

In an embodiment, in order to determine the maximum number of CCEs of each span, the number of limited CCEs of each span is firstly determined. In an embodiment, a manner for determining the number of limited CCEs of each span includes a step described below. The number of limited CCEs of each span (marked as C1) is configured.

In an embodiment, each span has a same number of limited CCEs which is greater than a CCE threshold of each span reported by the UE.

In an embodiment, in actual spans of one of the time span pattern or the slot, the number of limited CCEs of at least one span is configured to be greater than a CCE threshold of each span reported by the UE.

In an embodiment, C1 per span may be configured through the base station, and C1>C is allowed, where C is the CCE threshold per span reported by the UE (that is, according to C corresponding to the (X, Y) set reported by the UE). In an embodiment, the number of limited CCEs (i.e., C1) of each span is the same, and C1 may all be greater than C; or in actual spans of the span pattern/slot, C1 of one span, some spans or all spans may be configured to be greater than the maximum number of CCEs of each span reported by the UE. In this embodiment, when the maximum number of CCEs supported by the eMBB and the maximum number of CCEs supported by the URLLC may be shared, the capability of each span may be shared to different traffic, which improves the scheduling flexibility.

In an embodiment, the manner for determining the number of limited CCEs of each span may include a step described below. A sum of the CCE threshold of each span reported by the UE and the maximum number of CCEs of each slot is served as the number of limited CCEs of one or more spans. The maximum number of CCEs in each slot is one of the maximum number of CCEs in each slot of the R15 or the maximum number of CCEs for scheduling the eMBB per slot. In an embodiment, in a part of spans, the number of limited CCEs (i.e., C1) of a span is obtained by adding the CCE threshold (i.e., C) of each span reported by the UE with the maximum number of CCEs in each slot, and C1 of remaining spans may be equal to the CCE threshold of each span reported by the UE (i.e. C). For example, the number of limited CCEs of a first span in a slot (i.e., C1) is equal to the sum of the maximum number of CCEs in each slot of the R15 and the CCE threshold (i.e., C) of each span reported by the UE of the R15, and the number of limited CCEs (i.e., C1) of remaining spans is equal to the CCE threshold (i.e., C) of each span reported by the UE. In this embodiment, when the maximum number of CCEs supported by the eMBB and the maximum number of CCEs supported by the URLLC are not allowed to be shared, only spans having eMBB scheduling or common message scheduling are added with the CCE threshold, remaining spans still maintain the maximum number of CCEs supported by the URLLC, which is convenient for the terminal to classify and process different protocol versions or different traffic types, and the terminal processing complexity is reduced.

In an embodiment, determining/distinguishing CCEs used per span and CCEs used per slot (or determining/distinguishing CCEs used by the URLLC and CCEs used by the eMBB) includes one of manners described below. When new DCI is used, CCEs are determined through different search spaces. When normal DCI is reused, the CCEs are determined through different search spaces and different radio network temporary identifiers (RNTIs)/information domains; and the CCEs are determined through different control resource sets. In an embodiment, the CCEs are implicitly determined through different control resource sets, and are associated with a CORESET in their own CCE threshold for their own search space, for example, the URLLC is associated with a CORESET having 16 CCEs and the eMBB is associated with a CORESET having 56 CCEs. That is, it is determined by a control resource set identifier (ID) number (ControlResourceSetId) in configuration parameters of the search space (SS). According to the information determination method described in this embodiment, the CCE threshold of each span is determined by a same value or different values, which is applicable to different scenarios, for example, a scenario where the URLLC and the eMBB share the maximum CCE capability or the eMBB and the URLLC do not share the maximum CCE capability, thereby increasing the scheduling flexibility without exceeding the UE capability.

FIG. 2 is a block diagram of an information determination device according to an embodiment of the present application. As shown in FIG. 2, the information determination device includes: a first determining module 220.

The first determination module 220 is configured to determine a time domain resource allocation (TDRA) table with a physical downlink control channel (PDCCH) related symbol served as a reference point of a start length indicator value (SLIV).

The information determination device provided in this embodiment is configured to implement the information determination method of the embodiment shown in FIG. 1, and has a similar implementation principle and technical effect, which will not be described in detail herein.

In an embodiment, the PDCCH related symbol includes at least one of: a PDCCH starting symbol, a PDCCH ending symbol, a sum of the PDCCH starting symbol and a first preset number of symbols, or a sum of the PDCCH ending symbol and the first preset number of symbols; and the PDCCH starting symbol is a first symbol in time domain symbols used for transmitting a PDCCH, and the PDCCH ending symbol is a last symbol in time domain symbols used for transmitting the PDCCH.

In an embodiment, the step in which the TDRA table with the PDCCH related symbol served as the reference point of the SLIV is determined includes a step described below. The TDRA table with the PDCCH related symbol served as the reference point of the SLIV is determined in an independent configuration manner.

In an embodiment, the step in which the TDRA table with the PDCCH related symbol served as the reference point of the SLIV is determined includes a step described below. A TDRA table configured by serving a slot boundary as the reference point of the SLIV is taken as the TDRA table configured by serving the PDCCH related symbol as the reference point of the SLIV.

In an embodiment, the step in which the TDRA table with the PDCCH related symbol served as the reference point of the SLIV is determined includes steps described below. Whether serving the PDCCH related symbol as the reference point of the SLIV is in an invalid state is determined. When serving PDCCH related symbol as the reference point of the SLIV is not in the invalid state, a row index in the TDRA table is indicated by downlink control information (DCI).

In an embodiment, when a physical downlink shared channel (PDSCH) or a physical uplink shared channel (PUSCH) is used for scheduling, the invalid state includes at least one of: a case where the reference point of the SLIV exceeds the slot boundary, or a case where a sum of the reference point of the SLIV and a length exceeds the slot boundary.

In an embodiment, the step in which the TDRA table configured by serving the slot boundary as the reference point of the SLIV is taken as the TDRA table configured by serving the PDCCH related symbol as the reference point of the SLIV includes one of steps described below. The reference point of the SLIV of each row index in the TDRA table is configured as one of the PDCCH related symbol or the slot boundary. A reinterpretation of the reference point of the SLIV is performed, a starting symbol of the reinterpretation is S, and S=0.

In an embodiment, the step in which the TDRA table with the PDCCH related symbol served as the reference point of the SLIV is determined includes steps described below. A part of row indexes of the TDRA table configured by serving the slot boundary as the reference point of the SLIV is selected. The part of row indexes is served as the TDRA table with the PDCCH related symbol served as the reference point of the SLIV.

In an embodiment, the step in which the part of row indexes of the TDRA table configured by serving the slot boundary as the reference point of the SLIV is selected includes a step described below. First row indexes with a first preset number are selected as the part of row indexes. Alternatively, the part of row indexes are selected in a bitmap form.

In an embodiment, when there is more than one TDRA table, and at least one TDRA table uses the PDCCH related symbol served as the reference point of the SLIV, PDCCHs at different positions of the PDCCH related symbol or PDCCHs with different time spans use TDRA tables which are not totally same.

In an embodiment, the step in which the PDCCHs at different positions of the PDCCH related symbol or the PDCCHs with the different time spans use the TDRA tables which are not totally same includes one of steps described below.

A PDCCH at each position or a PDCCH with each span use one type of the TDRA tables.

X starting symbol sets use X TDRA tables respectively, elements in every two X starting symbol sets are different from each other and a union set of the X starting symbol sets includes all symbols in a slot, or elements in each of the X starting symbol sets are independently configured.

X span sets use X TDRA tables respectively, elements in every two X span sets are different from each other and a union set of the X span sets includes all spans in a time span pattern, or elements in each of the X span sets are independently configured.

The embodiments of the present application further provide an information determination device, the information determination device includes: a second determination module.

The second determination module is configured to determine a reference point of an SLIV, the reference point includes: a slot boundary or a PDCCH related symbol.

In an embodiment, the step of determining the reference point of the SLIV includes one of steps described below. The reference point of the SLIV is determined according to a traffic channel type, where the traffic channel type comprises a Type A and a Type B. The PDCCH related symbol is served as the reference point of the SLIV by default. And when a sum of the reference point of the SLIV and a length exceeds the slot boundary, it is determined that the reference point of the SLIV is the slot boundary. The reference point of the SLIV is determined according to a position of the PDCCH related symbol. The reference point of the SLIV is determined according to a downlink control information (DCI) format for scheduling a traffic channel.

In an embodiment, the step in which the reference point of the SLIV is determined according to the DCI format for scheduling the traffic channel includes a step described below. A TDRA table with the PDCCH related symbol served as the reference point of the SLIV is determined to be used in a first DCI format, the first DCI format includes one of: a new DCI format, a DCI format for scheduling a ultra reliable low latency communication (URLLC), a DCI format with a DCI size less than a preset threshold, or a DCI format with a time domain resource allocation domain size in DCI less than a preset threshold.

In an embodiment, in a case of the TDRA table used for scheduling a PUSCH, a manner for configuring the reference point of the SLIV includes one of steps described below. The reference point of the SLIV is configured independently. The PDCCH related symbol is served as the reference point of the SLIV by default. When the PUSCH is scheduled for repetition transmission, it is determined that the SLIV reference point is the slot boundary. When the PUSCH is scheduled for non-repetition transmission, it is determined that the SLIV reference star is the PDCCH related symbol.

In an embodiment, when the new DCI format is added, a manner for determining TDRA tables used by a time domain resource allocation in at least two different DCI formats includes one of steps described below.

A second DCI format uses a TDRA table configured by radio resource control (RRC). The first DCI format uses a default TDRA table. Default TDRA tables are configured independently for the at least two different DCI formats. The TDRA tables are configured independently for the at least two different DCI formats.

In an embodiment, the embodiment of the present application further provides an information determination device. When a first DCI format and a second DCI format are used for scheduling a traffic channel, a method for determining a priority corresponding to the traffic channel includes one of steps described below. A priority corresponding to the first DCI format for scheduling the traffic channel is configured to be higher than a priority corresponding to the second DCI format used for scheduling the traffic channel. A lowest priority corresponding to the first DCI format for scheduling the traffic channel is configured to be equal to a priority corresponding to the second DCI format used for scheduling the traffic channel.

In an embodiment, the embodiment of the present application further provides an information determination device. The device includes an execution module.

The execution module is configured to in a case of adding a new DCI format, perform a DCI size alignment operation; the new DCI format includes: a format 0_2 for scheduling an uplink traffic channel and a format 1_2 for scheduling a downlink traffic channel; a size threshold is a number of DCI size types, which are handled by a user equipment (UE) in each cell, less than or equal to 4, and a number of DCI size types, which are scrambled by a cell-radio network temporary identifier (C-RNTI), does not exceed 3; or a size threshold is a number of DCI size types, which are handled by UE in each cell, less than or equal to 5, and a number of DCI size types, which are scrambled by C-RNTI, does not exceed 4.

In an embodiment, when the size threshold is the number of DCI size types, which are handled by the UE in each cell, less than or equal to 4, and the number of DCI size types, which are scrambled by the C-RNTI, does not exceed 3, the step in which the DCI size alignment operation is performed includes steps described below. A size of a format 0_0 is aligned with a size of a format 1 0. A size of a format 0_1 is aligned with a size of a format 1 1. A size of the format 0_2 is aligned with a size of the format 1_2.

In an embodiment, when the size threshold is the number of DCI size types, which are handled by the UE in each cell, less than or equal to 4, and the number of DCI size types, which are scrambled by the C-RNTI, does not exceed 3, the step in which the DCI size alignment operation is performed includes steps described below.

A size of a format 0_2 is aligned with a size of a format 1_2 to a first type size. A first type size is aligned with one of a size of fallback DCI or a size of non-fallback DCI.

In an embodiment, the step in which the first type size is aligned with one of the size of fallback DCI or the size of non-fallback DCI includes one of steps described below.

The first type size is configured to be aligned with one of the size of the fallback DCI or the size of the non-fallback DCI according to higher layer signaling.

The first type size is aligned to one of the size of the fallback DCI or the size of the non-fallback DCI according to a size closest principle.

In an embodiment, the step in which the first type size is aligned to one of the size of the fallback DCI or the size of the non-fallback DCI according to the size closest principle includes steps described below.

When a size of DCI for scheduling a traffic channel is less than the size of the fallback DCI, an operation of aligning a size of a URLLC DCI to the size of the fallback DCI is not performed.

When the size of DCI for scheduling the traffic channel is greater than the size of the fallback DCI, an operation of aligning the first type size to one of the size of the fallback DCI or the size of the non-fallback DCI is performed according to the size closest principle.

In an embodiment, when the size threshold is the number of DCI size types, which are handled by the UE in each cell, less than or equal to 4, and the number of DCI size types, which are scrambled by the C-RNTI, does not exceed 3, the step in which the DCI size alignment operation is performed includes steps described below.

Within a time range of each time span, the number of DCI size types, which are handled by the UE in each cell, is configured to be less than or equal to 4, where the number of DCI size types, which are scrambled by the C-RNTI, does not exceed 3.

In an embodiment, when the size threshold is the number of DCI size types, which are handled by the UE in each cell, less than or equal to 5, and the number of DCI size types, which are scrambled by the C-RNTI, does not exceed 4, the step in which the DCI size alignment operation is performed includes one of steps described below. An alignment operation is performed on a size of the DCI format 0_2 for scheduling a traffic channel and a size of the DCI format 1_2 for scheduling a traffic channel. One of a size of the DCI format 0_2 for scheduling a traffic channel or a size of the DCI format 1_2 for scheduling a traffic channel is aligned to the size of the fallback DCI. One of a size of a DCI format 0_2 for scheduling a traffic channel or a size of a format 1_2 for scheduling a traffic channel is aligned to the size of the non-fallback DCI. A size of non-fallback UL DCI is aligned with a size of non-fallback DL DCI. A size of DCI for scheduling a traffic channel is aligned to one of the size of the fallback DCI or the size of the non-fallback DCI according to a preconfigured mode. A size of DCI for scheduling a traffic channel is aligned to one of the size of the fallback DCI or the size of the non-fallback DCI according to a preset rule.

In an embodiment, the information determination device further includes: a configuration module, which is configured to configure a format identification indication field for at least one DCI format.

In an embodiment, the information determination device further includes a distinguishing module, which is configured to distinguish two DCI formats for performing a DCI alignment operation through a format indication flag.

In an embodiment, the embodiment of the present application further provides an information determination device. The device includes a third determination module, which is configured to determine a maximum number of CCEs of each time span.

In an embodiment, the step in which the maximum number of CCEs of each span is determined includes one of steps described below.

The maximum number of CCEs of each span is determined according to a number of spans in a time span pattern, a number of actual spans in a slot, and a number of limited CCEs of each span. The maximum number of CCEs of each span is determined according to a number of limited CCEs in each slot, a number of actual spans in a slot, and a number of limited CCEs of each span.

In an embodiment, a manner for determining the number of limited CCEs of each span includes a step described below. The number of limited CCEs of each span is configured.

In an embodiment, each span has a same number of limited CCEs which is greater than a CCE threshold of each span reported by the UE.

In an embodiment, in actual spans of one of the time span pattern or the slot, the number of limited CCEs of one or more spans is configured to be greater than a CCE threshold of each span reported by the UE.

In an embodiment, the manner for determining the number of limited CCEs of each span includes a step described below.

A sum of a CCE threshold of each span reported by the UE and the maximum number of CCEs of each slot is served as the number of limited CCEs of at least one span.

FIG. 3 is a structural diagram of a device according to an embodiment of the present application. As shown in FIG. 3, the device provided in the present application includes a processor 310 and a memory 320. The device may have one or more processors 310, one processor 310 in the device is taken as an example in FIG. 3. The device may have one or more memories 320, one memory 320 in the device is taken as an example in FIG. 3. The processor 310 and the memory 320 of the device are connected by a bus or in other manners, and the connection by a bus is taken as an example in FIG. 3. In an embodiment, the device may be a base station.

The memory 320 as a computer-readable storage medium may be configured to store software programs, computer executable programs and modules such as program instructions/modules corresponding to the devices in any embodiment of the present application (such as the first determination module 220 in the information determination device). The memory 320 may mainly include a program storage region and a data storage region, where the program storage region may store an operating system and an application program required by at least one function while the data storage region may store data created depending on use of a device. In addition, the memory 320 may include a high-speed random access memory, and may also include a non-volatile memory such as at least one disk memory, flash memory or other non-volatile solid state memories. In some examples, the memory 320 may include memories which are remotely disposed relative to the processor 310 and these remote memories may be connected to the device via a network. Examples of the network described above include, but is not limited to, the Internet, an intranet, a local area network, a mobile communication network and a combination thereof.

The device provided above may be configured to execute the information determination method applied to the base station provided by any embodiment described above, and has corresponding functions and beneficial effects.

The embodiments of the present application further provide a storage medium including a computer-executable instruction. The computer-executable instruction, when executed by a computer processor, is used for executing an information determination method. The method is applied to a base station side and includes a step described below. A time domain resource allocation (TDRA) table with a physical downlink control channel (PDCCH) related symbol served as a reference point of a start length indicator value (SLIV) is determined.

The embodiments of the present application further provide a storage medium including a computer-executable instruction. The computer-executable instruction, when executed by a computer processor, is used for executing an information determination method. The method is applied to a base station side and includes a step described below. A reference point of an SLIV is determined. The reference point includes: a slot boundary or a PDCCH related symbol.

The embodiments of the present application further provide a storage medium including a computer-executable instruction. The computer-executable instruction, when executed by a computer processor, is used for executing an information determination method. The method is applied to a base station side and includes steps described below. When a first DCI format and a second DCI format are used for scheduling a traffic channel, a method for determining a priority corresponding to the traffic channel includes one of steps described below. A priority corresponding to the first DCI format for scheduling the traffic channel is configured to be higher than a priority corresponding to the second DCI format used for scheduling the traffic channel. A lowest priority corresponding to the first DCI format for scheduling the traffic channel is configured to be equal to a priority corresponding to the second DCI format used for scheduling the traffic channel.

The embodiments of the present application further provide a storage medium including a computer-executable instruction. The computer-executable instruction, when executed by a computer processor, is used for executing an information determination method. The method is applied to a base station side and includes a step described below. When a new DCI format is added, a DCI size alignment operation is performed. The new DCI format includes: a format 0_2 for scheduling an uplink traffic channel and a format 1_2 for scheduling a downlink traffic channel, where a size threshold is a number of DCI size types, which are handled by a user equipment (UE) in each cell, less than or equal to 4, and a number of DCI sizes types, which are scrambled by a cell-radio network temporary identifier (C-RNTI), does not exceed 3; or a size threshold is a number of DCI size types, which are handled by UE in each cell and less than or equal to 5, and a number of DCI size types, which are scrambled by C-RNTI, does not exceed 4.

The embodiments of the present application further provide a storage medium including a computer-executable instruction. The computer-executable instruction, when executed by a computer processor, is used for executing an information determination method. The method is applied to a base station side and includes a step described below. A maximum number of CCEs of each time span is determined.

The above are only exemplary embodiments of the present application and are not intended to limit the scope of the present application.

It should be understood by those skilled in the art that the term user equipment encompasses any suitable type of wireless user equipment, such as a mobile phone, a portable data processing apparatus, a portable web browser, or an onboard mobile station.

Generally speaking, various embodiments of the present application may be implemented in hardware or special purpose circuits, software, logic, or any combination thereof. For example, some aspects may be implemented in hardware, while other aspects may be implemented in firmware or software that may be executed by a controller, microprocessor, or other computing apparatuses, although the present application is not limited thereto.

The embodiments of the present application may be implemented by a data processor of a mobile apparatus executing computer program instructions, for example in a processor entity, or by hardware, or by a combination of software and hardware. The computer program instructions may be assembly instructions, instruction set architecture (ISA) instructions, machine instructions, machine-related instructions, micro-codes, firmware instructions, status setting data, or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. The computer programs may be stored on a memory. The memory may be of any type suitable to the local technical environment and may be implemented by using any suitable data storage technology. For example, the memory may be, but is not limited to, a read-only memory (ROM), a random access memory (RAM), an optical memory apparatus and system (a digital video disc (DVD) or a compact disc (CD)), or the like. The computer-readable medium may include a non-transitory storage medium. The data processor may be of any type suitable to the local technical environment, such as, but is not limited to, a general purpose computer, a special purpose computer, a microprocessor, a digital signal processing (DSP), an application specific integrated circuit (ASIC), a field-programmable gate array (FGPA), and a processor based on a multi-core processor architecture.

What is claimed is:

1. An information determination method, comprising:
determining, when a first downlink control information (DCI) format and a second DCI format are used for scheduling traffic channel and responsive to a collision in a time domain, a first priority corresponding to the first DCI format higher than a second priority corresponding to the second DCI format to schedule the traffic channel; and
performing subsequent operations in accordance with the first priority corresponding to the first DCI format and the second priority corresponding to the second DCI format, wherein when the first priority of a new DCI format corresponding to the first DCI format indicates a high priority and a low priority, the second priority of an original DCI format corresponding to the second DCI format is determined to be the low priority.

2. The method of claim 1, wherein the second DCI format is for non-fallback DCI.

3. The method of claim 1, wherein determining further comprises determining a lowest priority corresponding to the first DCI format to be equal to the second priority corresponding to the second DCI format.

4. The method of claim 1, wherein when the second DCI format is used by an ultra-reliable low latency communication (URLLC), the first DCI format is used by an enhanced mobile broadband (eMBB), and wherein when the second DCI format is used by the eMBB, the first DCI format is used by the URLLC.

5. The method of claim 4, wherein the URLLC reuses a same or different DCI format as a DCI format used by the eMBB.

6. The method of claim 1, wherein when a URLLC uses a new DCI format, the first DCI format includes the new DCI format and the second DCI format includes an original DCI format different from the new DCI format.

7. A device comprising:
at least one processor and a memory, the at least one processor is configured to:
determine, when a first downlink control information (DCI) format and a second DCI format are used for scheduling traffic channel and responsive to a collision in a time domain, a first priority corresponding to the first DCI format higher than a second priority corresponding to the second DCI format to schedule the traffic channel; and
perform subsequent operations in accordance with the first priority corresponding to the first DCI format and the second priority corresponding to the second DCI format,
wherein when the first priority of a new DCI format corresponding to the first DCI format indicates a high priority and a low priority, the second priority of an original DCI format corresponding to the second DCI format is determined to be the low priority.

8. The device of claim 7, wherein the second DCI format is for non-fallback DCI.

9. The device of claim 7, wherein the at least one processor is further configured to determine a lowest priority corresponding to the first DCI format to be equal to the second priority corresponding to the second DCI format.

10. The device of claim 7, wherein when the second DCI format is used by an ultra-reliable low latency communication (URLLC), the first DCI format is used by an enhanced mobile broadband (eMBB), and wherein when the second DCI format is used by the eMBB, the first DCI format is used by the URLLC.

11. The device of claim 10, wherein the URLLC reuses a same or different DCI format as a DCI format used by the eMBB.

12. The device of claim 7, wherein when a URLLC uses a new DCI format, the first DCI format includes the new DCI format and the second DCI format includes an original DCI format different from the new DCI format.

13. A non-transitory computer readable medium storing instructions, which when executed by at least one processor, cause the at least one processor to:
determine, when a first downlink control information (DCI) format and a second DCI format are used for scheduling traffic channel and responsive to a collision in a time domain, a first priority corresponding to the first DCI format higher than a second priority corresponding to the second DCI format to schedule the traffic channel; and
perform subsequent operations in accordance with the first priority corresponding to the first DCI format and the second priority corresponding to the second DCI format,
wherein when the first priority of a new DCI format corresponding to the first DCI format indicates a high priority and a low priority, the second priority of an original DCI format corresponding to the second DCI format is determined to be the low priority.

14. The non-transitory computer readable medium of claim 13, wherein the second DCI format is for non-fallback DCI.

15. The non-transitory computer readable medium of claim 13, wherein the instructions further cause the at least one processor to determine a lowest priority corresponding to the first DCI format to be equal to the second priority corresponding to the second DCI format.

16. The non-transitory computer readable medium of claim 14, wherein when the second DCI format is used by an ultra-reliable low latency communication (URLLC), the first DCI format is used by an enhanced mobile broadband (eMBB), and wherein when the second DCI format is used by the eMBB, the first DCI format is used by the URLLC.

17. The non-transitory computer readable medium of claim 14, wherein when a URLLC uses a new DCI format, the first DCI format includes the new DCI format and the second DCI format includes an original DCI format different from the new DCI format.

* * * * *